US012450946B2

(12) United States Patent
Jangid et al.

(10) Patent No.: US 12,450,946 B2
(45) Date of Patent: Oct. 21, 2025

(54) IMAGE-MODIFICATION TECHNIQUES

(71) Applicant: QUALCOMM Incorporated, San Diego, CA (US)

(72) Inventors: Chitranjan Jangid, Hyderabad (IN); Sandeep Sethia, Bengaluru (IN); Ravichandra Ponaganti, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 305 days.

(21) Appl. No.: 18/185,981

(22) Filed: Mar. 17, 2023

(65) Prior Publication Data

US 2024/0312251 A1  Sep. 19, 2024

(51) Int. Cl.
| | | |
|---|---|---|
| *G06V 40/18* | (2022.01) | |
| *G06T 5/50* | (2006.01) | |
| *G06T 5/60* | (2024.01) | |
| *G06T 5/77* | (2024.01) | |
| *G06T 7/10* | (2017.01) | |
| *G06T 7/50* | (2017.01) | |
| *G06T 11/60* | (2006.01) | |

(52) U.S. Cl.
CPC ............ *G06V 40/197* (2022.01); *G06T 7/10* (2017.01); *G06T 7/50* (2017.01); *G06T 2207/20132* (2013.01)

(58) Field of Classification Search
CPC .......... G06V 40/197; G06T 7/10; G06T 7/50; G06T 2207/20132; G06T 11/60; G06T 2207/10028; G06T 2207/20081; G06T 2207/20084; G06T 2207/30201; G06T 5/50; G06T 5/60; G06T 5/77
See application file for complete search history.

(56) References Cited

U.S. PATENT DOCUMENTS

| | | | | |
|---|---|---|---|---|
| 8,509,545 | B2 * | 8/2013 | Dedhia | ...... G06T 7/12 382/173 |
| 9,076,221 | B2 * | 7/2015 | Xiong | ....... G06T 5/77 |
| 9,560,271 | B2 * | 1/2017 | Na | ........... H04N 23/80 |
| 10,713,470 | B2 * | 7/2020 | Chang | .......... G06F 18/2413 |
| 11,715,213 | B2 * | 8/2023 | Leung | ..... G06V 10/22 382/103 |
| 12,023,128 | B2 * | 7/2024 | Weitz | ..... G06V 10/141 |
| 2012/0262569 | A1 * | 10/2012 | Cudak | .......... H04N 23/58 348/222.1 |
| 2012/0320237 | A1 * | 12/2012 | Liu | ......... H04N 5/272 348/E5.051 |

(Continued)

OTHER PUBLICATIONS

"How to Add a Person to a Group Photo in Photoshop" (Cut Out Bees, 2021). (Year: 2021).*

*Primary Examiner* — Gregory A Morse
*Assistant Examiner* — Ronde Lee Miller
(74) *Attorney, Agent, or Firm* — Polsinelli LLP

(57) ABSTRACT

Systems and techniques are described herein for generating an image. For instance, a method for generating an image is provided. The method may include obtaining a first image including a first subject and a second subject; obtaining a second image including the first subject and the second subject; determining a gaze of the first subject in the first image; and maintaining the first subject in the second image based on the gaze of the first subject and removing the second subject from the second image.

30 Claims, 15 Drawing Sheets

(56) References Cited

U.S. PATENT DOCUMENTS

| | | | | |
|---|---|---|---|---|
| 2016/0078598 | A1* | 3/2016 | Tanabe | G06T 3/4007 |
| | | | | 382/284 |
| 2018/0249091 | A1* | 8/2018 | Ding | G06T 7/254 |
| 2019/0075236 | A1* | 3/2019 | Cheung | G06T 7/90 |
| 2019/0075237 | A1* | 3/2019 | Cheung | G06V 40/103 |
| 2020/0380243 | A1* | 12/2020 | Singh | G06V 40/173 |
| 2021/0203837 | A1* | 7/2021 | Otsubo | G06V 40/10 |
| 2021/0295529 | A1* | 9/2021 | Li | G06T 7/174 |
| 2021/0352222 | A1* | 11/2021 | Zavesky | G06T 5/50 |
| 2021/0368094 | A1* | 11/2021 | Li | H04N 23/633 |
| 2023/0036338 | A1* | 2/2023 | Liu | G06V 10/82 |
| 2023/0092282 | A1* | 3/2023 | Boesel | G06T 19/20 |
| | | | | 715/849 |
| 2023/0353701 | A1* | 11/2023 | Shukla | H04N 23/617 |
| 2024/0013351 | A1* | 1/2024 | Liu | G06T 7/11 |
| 2024/0230866 | A1* | 7/2024 | Ma | G06T 7/10 |
| 2024/0256033 | A1* | 8/2024 | Godo | G06F 3/013 |
| 2024/0257309 | A1* | 8/2024 | Holland | G06T 7/30 |
| 2024/0312251 | A1* | 9/2024 | Jangid | G06T 7/10 |
| 2025/0069322 | A1* | 2/2025 | Lee | G06T 5/50 |

* cited by examiner

IMAGE-MODIFICATION TECHNIQUES

TECHNICAL FIELD

The present disclosure generally relates to image modification. For example, aspects of the present disclosure relate to systems and techniques for modifying an image, for example, by removing a subject (e.g., a person) from the image based on a gaze of the subject.

BACKGROUND

Many devices and systems allow a scene to be captured by generating images and/or video data (including multiple images) of the scene. For example, a camera or a device including a camera can capture a sequence of images of a scene (e.g., a video of a scene). In some cases, the sequence of images can be processed for performing one or more functions, can be output for display, can be output for processing and/or consumption by other devices, among other uses.

A captured image may include a subject-of-interest (e.g., a person) and unwanted subjects (e.g., one or more other people in the background of the image). For example, at a tourist destination, a person may capture an image of their friends and/or family (and/or themselves, e.g., in a selfie) at the tourist destination. The friends or family (and/or the person themselves) may be the subject-of-interest of the captured image. The captured image may include additional people that are not wanted in the image (e.g., other tourists at the destination).

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Systems and techniques are described for generating an image. According to at least one example, a method is provided for generating an image. The method includes: obtaining a first image including a first subject and a second subject; obtaining a second image including the first subject and the second subject; determining a gaze of the first subject in the first image; and maintaining the first subject in the second image based on the gaze of the first subject and removing the second subject from the second image.

In another example, an apparatus for generating an image is provided that includes at least one memory and at least one processor (e.g., configured in circuitry) coupled to the at least one memory. The at least one processor is configured to: obtain a first image including a first subject and a second subject; obtain a second image including the first subject and the second subject; determine a gaze of the first subject in the first image; and maintain the first subject in the second image based on the gaze of the first subject and remove the second subject from the second image.

In another example, a non-transitory computer-readable medium is provided that has stored thereon instructions that, when executed by one or more processors, cause the one or more processors to: obtain a first image including a first subject and a second subject; obtain a second image including the first subject and the second subject; determine a gaze of the first subject in the first image; and maintain the first subject in the second image based on the gaze of the first subject and remove the second subject from the second image.

In another example, an apparatus for generating an image is provided. The apparatus includes: means for obtaining a first image including a first subject and a second subject; means for obtaining a second image including the first subject and the second subject; means for determining a gaze of the first subject in the first image; and means for maintaining the first subject in the second image based on the gaze of the first subject and removing the second subject from the second image.

In some aspects, one or more of the apparatuses described above is, is part of, or includes a mobile device (e.g., a mobile telephone or so-called "smart phone" or other mobile device), a wearable device, an extended reality device (e.g., a virtual reality (VR) device, an augmented reality (AR) device, or a mixed reality (MR) device), a camera, a personal computer, a laptop computer, a server computer, a vehicle (e.g., a computing device of a vehicle), or other device. In some aspects, an apparatus may include a camera or multiple cameras for capturing one or more images. In some aspects, the apparatus includes a display for displaying one or more images, notifications, and/or other displayable data.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip aspects or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description.

BRIEF DESCRIPTION OF THE DRAWINGS

Illustrative aspects of the present application are described in detail below with reference to the following figures.

DETAILED DESCRIPTION

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the scope of the application as set forth in the appended claims.

Figure 1:
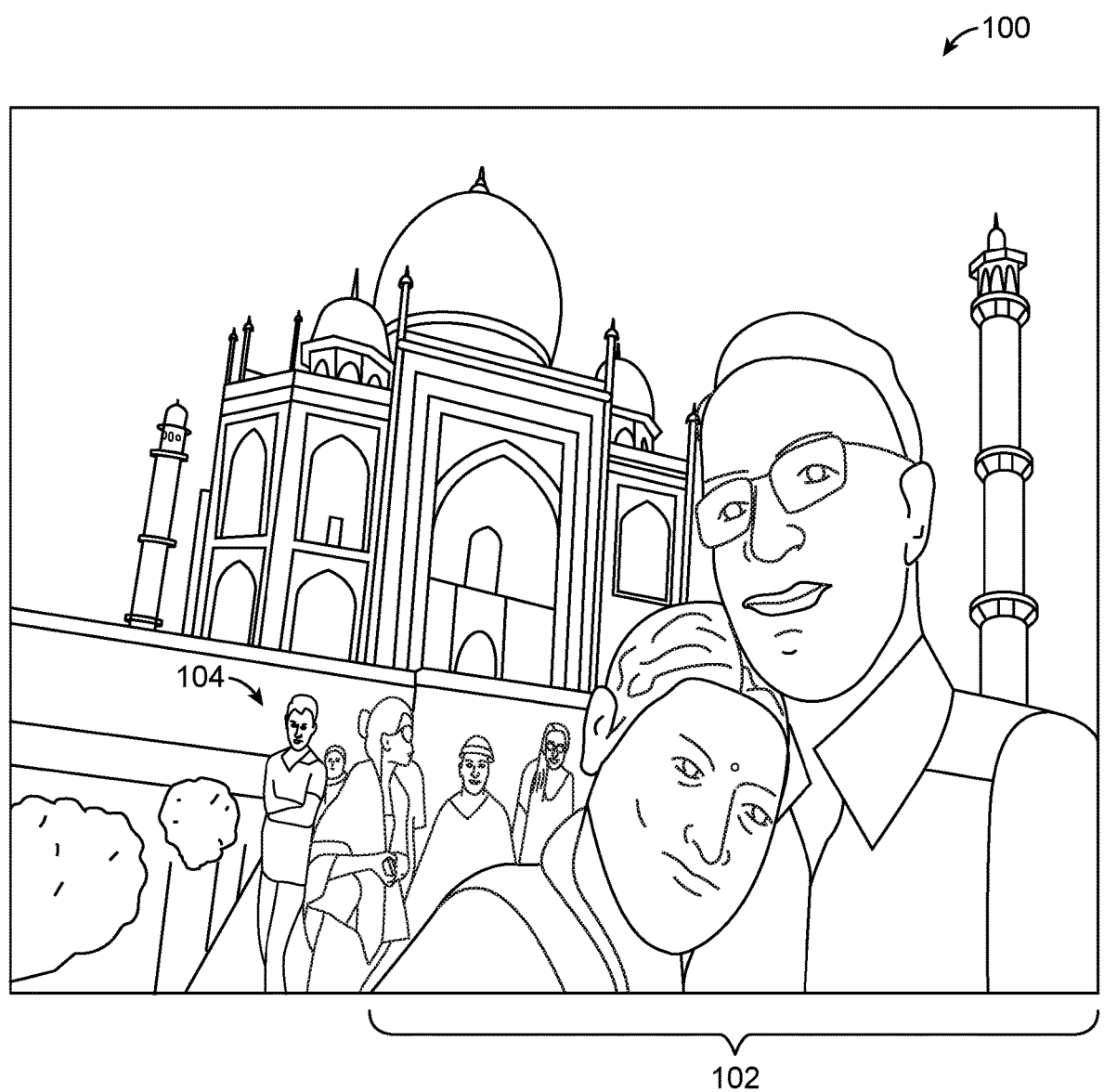
FIG. 1 illustrates an example image.

As described previously, a captured image may include a subject-of-interest (e.g., a person) and unwanted subjects (e.g., one or more other people or objects in the background of the image). FIG. 1 illustrates an example image 100 that includes two people 102 that are the subjects-of-interest of image 100. Image 100 additionally includes other people 104 that are unwanted in image 100. For example, a friend or family member of people 102 may have captured image 100 with the intent to capture image 100 of people 102 at the location of image 100 but not with the other people 104.

Figure 2:
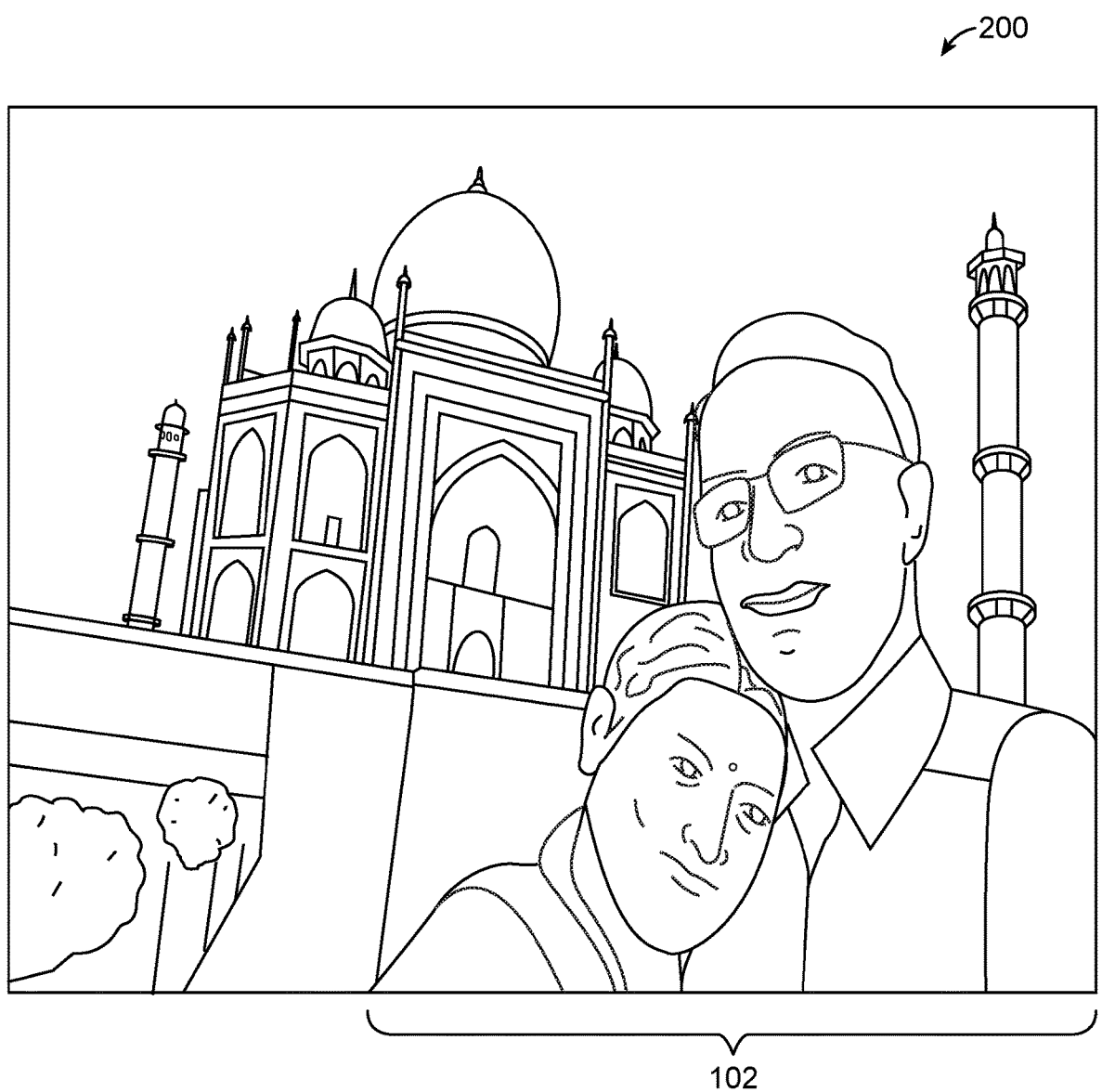
FIG. 2 illustrates example image modified, in accordance with some examples of the present disclosure.

It would be beneficial to modify an image to remove unwanted subjects from the image. FIG. 2 illustrates an example of an image 200 that is a result of modifying the image 100 of FIG. 1 to remove people 104 that are not the subjects-of-interest of image 100. For example, image 200 is an example of image 100 of FIG. 1 after image 100 is modified to retain people 102 and to remove other people 104. Image 100 may be modified to generate image 200 by systems and techniques described herein or by another technique.

One example of a technique for modifying an image (e.g., image 100 of FIG. 1) to generate a modified image (e.g., image 200 of FIG. 2) may include capturing multiple images by an image sensor while the device that includes the images sensor (e.g., a camera or smart phone) is being pointed at the subjects-of-interest and/or while the subjects-of-interest are posing. The multiple images may be captured while the device is displaying a preview image on a display of the device. The technique may compare the multiple images to determine motion vectors (e.g., based on optical flow techniques) indicating movement of the other subjects (e.g., other people 104) in the image. For instance, referring to FIG. 1 as an illustrative example, the technique may determine to remove other people 104 from image 100 based on the motion vectors indicating the other people 104 are moving between the time the multiple images are captured. Such a technique may rely on the assumption that people 102 are posing and remain substantially motionless while other people 104 may move about. However, such a motion-based technique needs to analyze multiple images to detect motion, leading to unnecessary use of storage for the images. Further, when motion of subjects is continuously detected using the motion-based techniques, it can become difficult to identify and remove the unwanted subjects.

Systems, apparatuses, processes (also referred to as methods), and computer-readable media (collectively referred to as "systems and techniques") are described herein for modifying images. For instance, the systems and techniques may modify an image, for example, by removing unwanted subjects (e.g., people) from the image. The systems and techniques may determine which subjects to retain and which to remove based on one or more criteria, such as based on gazes of one or more of the subjects, depths of the one or more subjects, and/or other criteria.

For example, the systems and techniques may obtain an image. The image may be obtained from an image sensor of a device prior to receiving a user input instructing the device to capture an image. For instance, the image may be obtained before a user takes a photo. In one illustrative example, the image may be obtained from preview images that may be displayed at a display of the device. The systems and techniques may identify subjects in the image, such as using object detection. In one illustrative example, the systems and techniques may identify all people in an image using a person-detection model.

Additionally, the systems and techniques may identify subjects-of-interest in the image based on gazes of the subjects, depth of the subjects, and/or other criteria. For example, the systems and techniques may determine gazes of the detected subjects using a gaze-estimation model. The systems and techniques may determine that subjects that are gazing at an image sensor used to capture the image are subjects-of-interest of the image. Additionally or alternatively, the systems and techniques may determine depth estimates relative to the subjects. The depth estimates may represent distances between an image sensor that captured the image and the respective subjects. The systems and techniques may determine a depth estimate relative to a subject-of-interest and compare the depth estimate relative to the subject-of-interest to the depth estimates relative to other subjects in the image. The systems and techniques may determine that subjects that are less than (or within) a depth threshold difference from the depth estimate of the subject-of-interest are subjects-of-interest. For example, having identified a subject-of-interest, the systems and techniques may determine that a second subject that is substantially the same distance from (e.g., the same distance plus or minus 10%) the camera which captured the image as the subject-of-interest is also a subject-of-interest, even if, for example, the second subject was not gazing into the camera.

Additionally or alternatively, the systems and techniques may determine that subjects in the image are unwanted in the image based on gazes of the other subjects, depth of the other subjects, and/or one or more criteria. For example, the systems and techniques may determine that subjects (e.g., subjects not identified as subjects-of-interest) that are not gazing into the image sensor used to capture the image are unwanted in the image. Additionally or alternatively, subjects (e.g., not identified as subjects-of-interest) may be identified as unwanted in the image based on the subjects having depth estimates that are greater than (or outside of) a depth threshold difference from the depth estimate of to the subject-of-interest. For example, the subjects that are closer to, or farther from, the image sensor which captured the image than the subject-of-interest is to the image sensor, by a depth threshold difference, may be identified as unwanted in the image. As an example, a person that happened to be gazing into the camera may be identified as unwanted in the image based on the person being ten feet behind a subject of interest of the image.

Additionally or alternatively, the systems and techniques may determine that subjects not identified as subjects-of-interest are unwanted in the image. For example, after having determined subjects-of-interest based on one or more criteria, the systems and techniques may determine that all remaining subjects are unwanted without analyzing gaze and/or depth information of the remaining subjects. Determining that subjects that were not identified as subjects-of-interest are unwanted in the image may result in subjects whose gaze and/or depth could not be determined being identified as unwanted subjects.

The systems and techniques may remove the unwanted subjects from the image. In some aspects, removing unwanted subjects may include replacing the removed subjects with background pixels. In some cases, the systems and techniques may replicate background pixels that are in the image to replace the pixels representing the removed subjects. For example, the systems and techniques may identify pixels adjacent to pixels representing unwanted subjects and replicate one or more of the identified pixels to replace the pixels representing the unwanted subjects. In other cases, the systems and techniques may obtain background pixels from another image (e.g., another image including the background of the image) and use the background pixels from the other image to replace the pixels representing the unwanted subjects in the image. For example, the systems and techniques may identify a background of the image and may identify the other image that also includes the background of the image, but without the subjects that are unwanted. The systems and techniques may take background pixels corresponding to the background from the other image and add the background pixels to the image to replace the pixels representing the unwanted subjects.

In some cases, the systems and techniques may remove the unwanted subjects from the image, display the image using a display of the device, and/or save the image (e.g., as a final image). Additionally or alternatively, the systems and techniques may use the determination of unwanted subjects to remove the unwanted subjects from another image. For example, the systems and techniques may identify unwanted subjects from a first image (e.g., a preview image) and may remove the unwanted subjects from a second image (e.g., an image captured in response to a user providing input instructing the device to capture the second image).

Determining to remove subjects, and/or removing the subjects, based on gaze and/or depth information derived from the image, or from a preview image, may provide advantages over other techniques for removing subjects from images. As an example, removing subjects based on gaze and/or depth information (e.g., derived from the image, or from a preview image) may use less memory than a technique which removes subjects based on analyzing multiple preview images to determine motion of subjects. For example, examples disclosed herein may remove unwanted subjects based on analyzing one image. In contrast, as noted previously, motion-based techniques need to analyze two or more images, leading to unnecessary use of storage for the images. Further, when motion of subjects is continuously detected using the motion-based techniques, it can become difficult to identify and remove the unwanted subjects.

Various aspects of the systems and techniques are described herein and will be discussed below with respect to the figures.

Figure 3:
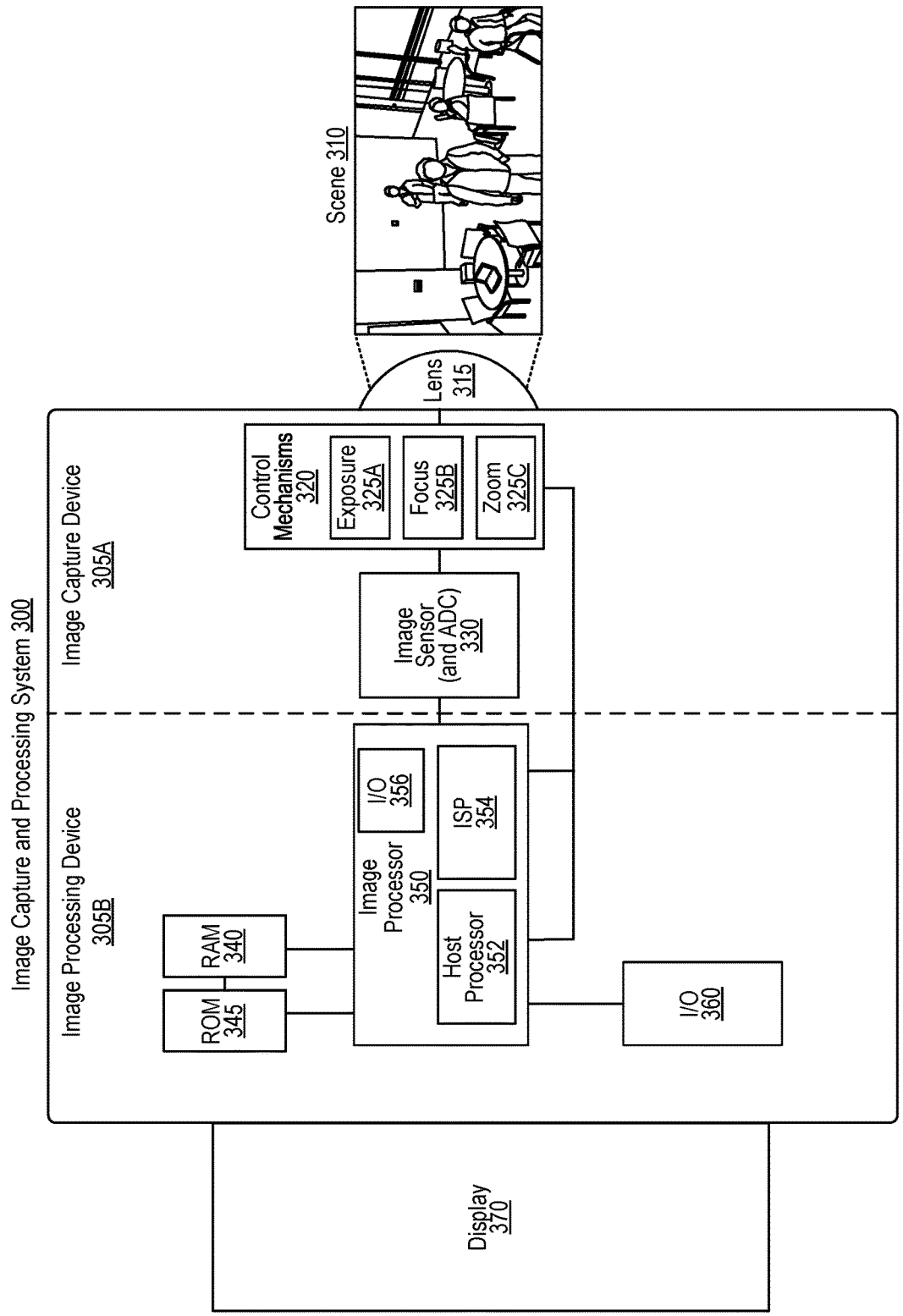
FIG. 3 is a block diagram illustrating an architecture of an image capture and processing device, in accordance with some examples of the present disclosure.

FIG. 3 is a block diagram illustrating an architecture of an image capture and processing system 300. The image capture and processing system 300 includes various components that are used to capture and process images of scenes (e.g., an image of a scene 310). The image capture and processing system 300 can capture standalone images (or photographs) and/or can capture videos that include multiple images (or video frames) in a particular sequence. A lens 315 of the image capture and processing system 300 faces a scene 310 and receives light from the scene 310. The lens 315 bends the light toward the image sensor 330. The light received by the lens 315 passes through an aperture controlled by one or more control mechanisms 320 and is received by an image sensor 330.

The one or more control mechanisms 320 may control exposure, focus, and/or zoom based on information from the image sensor 330 and/or based on information from the image processor 350. The one or more control mechanisms 320 may include multiple mechanisms and components; for instance, the control mechanisms 320 may include one or more exposure control mechanisms 325A, one or more focus control mechanisms 325B, and/or one or more zoom control mechanisms 325C. The one or more control mechanisms 320 may also include additional control mechanisms besides those that are illustrated, such as control mechanisms controlling analog gain, flash, HDR, depth of field, and/or other image capture properties.

The focus control mechanism 325B of the control mechanisms 320 can obtain a focus setting. In some examples, focus control mechanism 325B store the focus setting in a memory register. Based on the focus setting, the focus control mechanism 325B can adjust the position of the lens 315 relative to the position of the image sensor 330. For example, based on the focus setting, the focus control mechanism 325B can move the lens 315 closer to the image sensor 330 or farther from the image sensor 330 by actuating a motor or servo (or other lens mechanism), thereby adjusting focus. In some cases, additional lenses may be included in the image capture and processing system 300, such as one or more microlenses over each photodiode of the image sensor 330, which each bend the light received from the lens 315 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 320, the image sensor 330, and/or the image processor 350. The focus setting may be referred to as an image capture setting and/or an image processing setting.

The exposure control mechanism 325A of the control mechanisms 320 can obtain an exposure setting. In some cases, the exposure control mechanism 325A stores the exposure setting in a memory register. Based on this exposure setting, the exposure control mechanism 325A can control a size of the aperture (e.g., aperture size or f/stop), a duration of time for which the aperture is open (e.g., exposure time or shutter speed), a sensitivity of the image sensor 330 (e.g., ISO speed or film speed), analog gain applied by the image sensor 330, or any combination thereof. The exposure setting may be referred to as an image capture setting and/or an image processing setting.

The zoom control mechanism 325C of the control mechanisms 320 can obtain a zoom setting. In some examples, the zoom control mechanism 325C stores the zoom setting in a memory register. Based on the zoom setting, the zoom control mechanism 325C can control a focal length of an assembly of lens elements (lens assembly) that includes the lens 315 and one or more additional lenses. For example, the zoom control mechanism 325C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 315 in some cases) that receives the light from the scene 310 first, with the light then passing through an afocal zoom system between the focusing lens (e.g., lens 315) and the image sensor 330 before the light reaches the image sensor 330. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 325C moves one or more of the lenses in the afocal zoom system, such as the negative lens and one or both of the positive lenses.

The image sensor 330 includes one or more arrays of photodiodes or other photosensitive elements. Each photodiode measures an amount of light that eventually corresponds to a particular pixel in the image produced by the image sensor 330. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors (e.g., image sensor 330) may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 330 may alternately or additionally include opaque and/or reflective masks that block light from reaching certain photodiodes, or portions of certain photodiodes, at certain times and/or from certain angles, which may be used for phase detection autofocus (PDAF). The image sensor 330 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 320 may be included instead or additionally in the image sensor 330. The image sensor 330 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 350 may include one or more processors, such as one or more image signal processors (ISPs) (including ISP 354), one or more host processors (including host processor 352), and/or one or more of any other type of processor 1510 discussed with respect to the computing system 1500. The host processor 352 can be a digital signal processor (DSP) and/or other type of processor. In some implementations, the image processor 350 is a single integrated circuit or chip (e.g., referred to as a system-on-chip or SoC) that includes the host processor 352 and the ISP 354. In some cases, the chip can also include one or more input/output ports (e.g., input/output (I/O) ports 356), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 356 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 352 can communicate with the image sensor 330 using an I2C port, and the ISP 354 can communicate with the image sensor 330 using an MIPI port.

The image processor 350 may perform a number of tasks, such as de-mosaicing, color space conversion, image frame downsampling, pixel interpolation, automatic exposure (AE) control, automatic gain control (AGC), CDAF, PDAF, automatic white balance, merging of images to form an HDR image, image recognition, object recognition, feature recognition, receipt of inputs, managing outputs, managing a memory, or some combination thereof. The image processor 350 may store image frames and/or processed images in random access memory (RAM) 140/3225, read-only memory (ROM) 145/1520, a cache, a memory unit, another storage device, or some combination thereof.

Various input/output (I/O) devices 360 may be connected to the image processor 350. The I/O devices 360 can include a display screen, a keyboard, a keypad, a touchscreen, a trackpad, a touch-sensitive surface, a printer, any other output devices 1535, any other input devices 1545, or some combination thereof. In some cases, a caption may be input into the image processing device 305B through a physical keyboard or keypad of the I/O devices 360, or through a virtual keyboard or keypad of a touchscreen of the I/O devices 360. The I/O devices 360 may include one or more ports, jacks, or other connectors that enable a wired connection between the image capture and processing system 300 and one or more peripheral devices, over which the image capture and processing system 300 may receive data from the one or more peripheral device and/or transmit data to the one or more peripheral devices. The I/O devices 360 may include one or more wireless transceivers that enable a wireless connection between the image capture and processing system 300 and one or more peripheral devices, over which the image capture and processing system 300 may receive data from the one or more peripheral device and/or transmit data to the one or more peripheral devices. The peripheral devices may include any of the previously-discussed types of I/O devices 360 and may themselves be considered I/O devices 360 once they are coupled to the ports, jacks, wireless transceivers, or other wired and/or wireless connectors.

In some cases, image capture and processing system 300 may additionally include display 370. Image capture and processing system 300 may display, using display 370, images captured at image sensor 330. In some cases, the displayed images can include images captured using the image sensor 330 in response to a user input instructing image capture and processing system 300 to capture the images (e.g., based on selecting an image capture user interface element, such as a shutter button or user interface element). Additionally or alternatively, the displayed images can include images captured prior to the user instructing image capture and processing system 300 to capture an image (e.g., preview images). In some instances, image capture and processing system 300 may continuously capture preview images and display the preview images at display 370. The captured preview images may be stored by image capture and processing system 300 (e.g., in a buffer such as a preview buffer (not shown) or in another memory). In response to a user input instructing image capture and processing system 300 to capture an image (or a series of images, e.g., a video), image capture and processing system 300 may capture an image (or a series of images), such as a preview image buffered at the time the user input is received and may store the captured image (or series of images) at RAM 340, ROM 345, or at another memory. In some cases, the image capture and processing system 300 may send or transmit the captured image (or series of images) at I/O devices 360 to another component or system of a device or to another device.

In some cases, the image capture and processing system 300 may be a single device. In some cases, the image capture and processing system 300 may be two or more separate devices, including an image capture device 305A (e.g., a camera), an image processing device 305B (e.g., a computing device coupled to the camera), and/or a display (e.g., a screen coupled to the camera). In some implementations, the image capture device 305A, the image processing device 305B, and/or the display 370 may be coupled together, for example via one or more wires, cables, or other electrical connectors, and/or wirelessly via one or more wireless transceivers. In some implementations, the image capture device 305A, the image processing device 305B, and/or the display 370 may be disconnected from one another.

As shown in FIG. 3, a vertical dashed line divides the image capture and processing system 300 of FIG. 3 into two portions that represent the image capture device 305A and the image processing device 305B, respectively. The image capture device 305A includes the lens 315, control mechanisms 320, and the image sensor 330. The image processing device 305B includes the image processor 350 (including the ISP 354 and the host processor 352), the RAM 340, the ROM 345, and the I/O devices 360. In some cases, certain components illustrated in the image capture device 305A, such as the ISP 354 and/or the host processor 352, may be included in the image capture device 305A.

The image capture and processing system 300 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 300 can include one or more wireless transceivers for wireless communications, such as cellular network communications, 802.11 wi-fi communications, wireless local area network (WLAN) communications, or some combination thereof. In some implementations, the image capture device 305A and the image processing device 305B can be different devices. For instance, the image capture device 305A can include a camera device and the image processing device 305B can include a computing device, such as a mobile handset, a desktop computer, or other computing device.

While the image capture and processing system 300 is shown to include certain components, one of ordinary skill will appreciate that the image capture and processing system 300 can include more components than those shown in FIG. 3. The components of the image capture and processing system 300 can include software, hardware, or one or more combinations of software and hardware. For example, in some implementations, the components of the image capture and processing system 300 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 300. In some examples, the image-modification system 400 can include the image capture and processing system 300, the image capture device 305A, the image processing device 305B, or a combination thereof.

Figure 4:
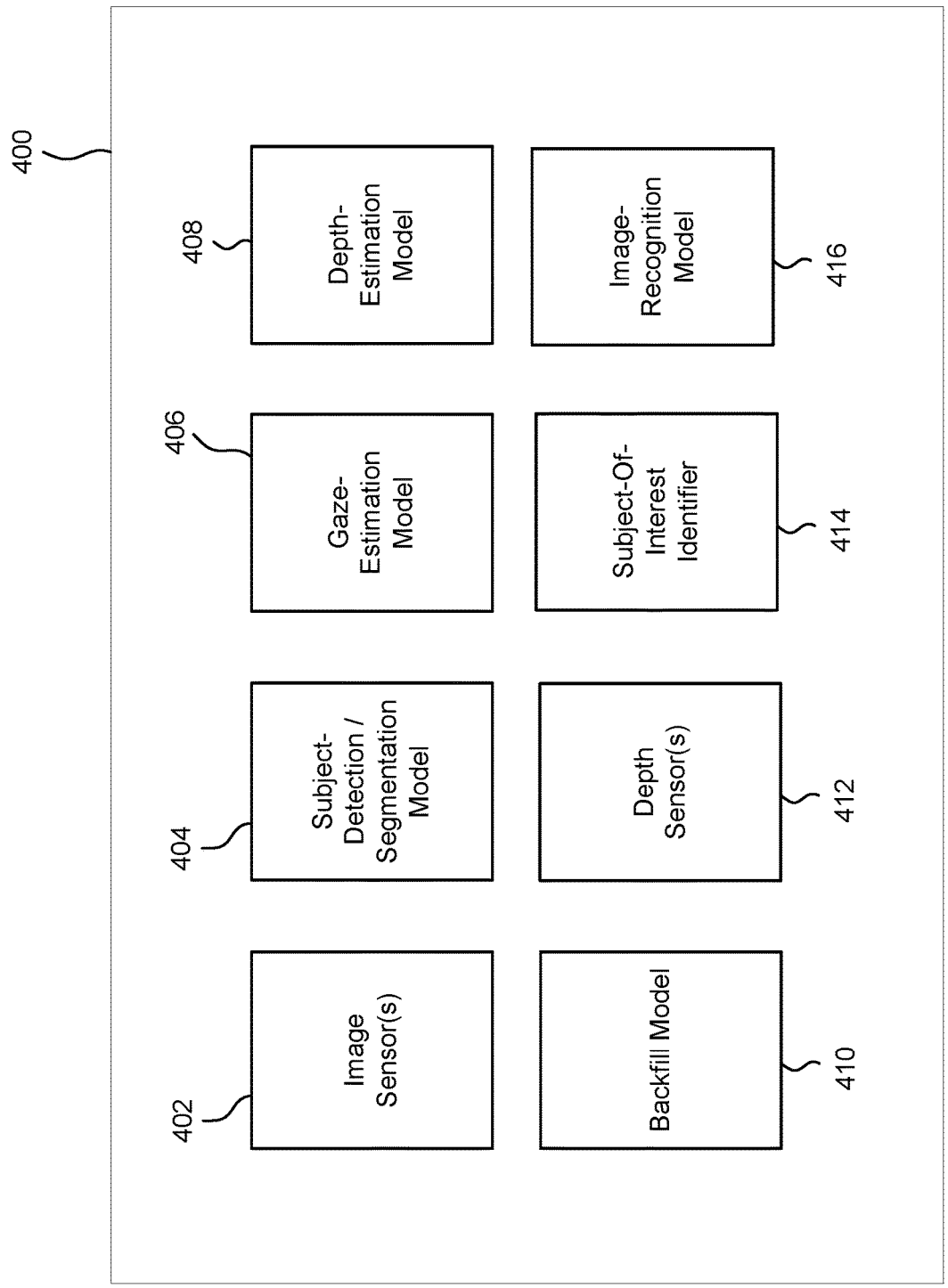
FIG. 4 is a block diagram illustrating an example image-modification system, in accordance with some examples of the present disclosure.

FIG. 4 is a block diagram illustrating an example of an image-modification system 400. The image-modification system 400 includes various components that are used to modify one or more images, such as removing unwanted subjects from the one or more images. The image-modification system 400 may identify one or subjects-of-interest and one or more unwanted subjects in the one or more images and may remove the unwanted subjects from the one or more images. As shown, the components of the image-modification system 400 include one or more image sensors 402, a subject-detection/subject-detection/segmentation model 404, a gaze-estimation model 406, a depth-estimation model 408, a backfill model 410, depth sensors 412, a subject-of-interest identifier 414, and/or an image-recognition model 416.

The image-modification system 400 can include or be part of a camera, a mobile or stationary telephone handset (e.g., smartphone, cellular telephone, or the like), a server computer (e.g., in communication with a vehicle computing system), a desktop computer, a laptop or notebook computer, a tablet computer, a set-top box, a television, a camera, a display device, a digital media player, a video streaming device, or any other suitable electronic device. In some examples, the image-modification system 400 can include one or more wireless transceivers (or separate wireless receivers and transmitters) for wireless communications, such as cellular network communications, 802.11 Wi-Fi communications, wireless local area network (WLAN) communications, Bluetooth or other short-range communications, any combination thereof, and/or other communications. In some implementations, the components of the image-modification system 400 (e.g., the image sensors 402, the subject-detection/subject-detection/segmentation model 404, the gaze-estimation model 406, the depth-estimation model 408, the backfill model 410, the depth sensors 412, the subject-of-interest identifier 414, and/or the image-recognition model 416) can be part of the same computing device. In some implementations, the components of the image-modification system 400 can be part of two or more separate computing devices. In some cases, the image-modification system 400 can be implemented as part of the computing system 1500 shown in FIG. 15.

While the image-modification system 400 is shown to include certain components, one of ordinary skill will appreciate that the image-modification system 400 can include more components or fewer components than those shown in FIG. 4. In some cases, additional components of the image-modification system 400 can include software, hardware, or one or more combinations of software and hardware. For example, in some cases, the image-modification system 400 can include one or more other sensors (e.g., one or more inertial measurement units (IMUs), radars, light detection and ranging (LIDAR) sensors, audio sensors, etc.), one or more display devices, one or more other processing engines, one or more other hardware components, and/or one or more other software and/or hardware components that are not shown in FIG. 4. In some implementations, additional components of the image-modification system 400 can include and/or can be implemented using electronic circuits or other electronic hardware, which can include one or more programmable electronic circuits (e.g., digital signal processors (DSPs), microprocessors, microcontrollers, graphics processing units (GPUs), central processing units (CPUs), any combination thereof, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image-modification system 400.

The image sensors 402 can capture one or more images. The image sensors 402 can be included in a mobile device and can be directed toward a user of the device (e.g., with one or more front facing cameras) and/or directed away from the user of the device (e.g., with one or more rear facing cameras).

Each of the image sensors 402 can include a camera or other type of image sensor. In some examples, the image sensors 402 can include a camera configured to capture color images and/or monochrome images. The color images can include: red-green-blue (RGB) images; luma, chroma-blue, chroma-red (YCbCr or Y'CbCr) images; and/or any other suitable type of image. In one illustrative example, the image-modification system 400 can include an RGB camera or multiple RGB cameras. In some cases, the image sensors 402 can include one or more IR cameras and one or more RGB cameras.

In some aspects, image-modification system 400 can include depth sensors 412. The depth sensors 412 can obtain measurements of distance corresponding to objects in a captured scene. In one illustrative example, a depth sensor 412 can take the form of a light source that can project a structured or textured light pattern, which may include one or more narrow bands of light, onto one or more objects in a scene. Depth information can then be obtained by exploiting geometrical distortions of the projected pattern caused by the surface shape of objects. In some cases, the depth sensors 412 can produce depth images that include depth values corresponding to pixel locations in one or more images captured by the image sensors 402. In some cases, the depth sensor 412 can be located in the same general location as other sensors of the image sensors 402. In some cases, the depth sensor 412 can capture a depth image simultaneously with an image captured by one or more other sensors included in the image sensors 402. In some implementations, the systems and techniques described herein can also be used when depth information is inferred from the one or more images.

In one illustrative example, the image sensors 402, and in some cases the depth sensors 412, can capture one or more RGB-D images. In some cases, the image sensors 402 can capture other images types that include depth information, such as monochrome-depth, NIR-depth, or the like. For the purposes of illustration, examples of the present disclosure discuss performing image adjustment on RGB-D images, but the systems and techniques described herein can also be used with other image types that include depth information without departing from the scope of the present disclosure.

The one or more images captured by the image sensors 402 can be provided as input to the subject-detection/segmentation model 404. The subject-detection/segmentation model 404 may be, or may include, a machine-learning model trained to detect one or more features. In some cases, the subject-detection/segmentation model 404 can be further trained to provide one or more classifications to objects in the one or more images based on the detected features. The subject-detection/segmentation model 404 can use the classifications to segment the image into different portions associated with the one or more classifications. For example, the subject-detection/segmentation model 404 can segment the one or more images into different portions associated with different classifications, such as people, buildings, cars, furniture, plants, or the like. Additionally or alternatively, subject-detection/segmentation model 404 may be specifically trained to detect subjects (e.g., people and/or animals). Further subject-detection/segmentation model 404 may be specifically trained to segment images into portions representing subjects and portions not representing subjects. Additional details regarding an example implementation of subject-detection/segmentation model 404 are given with regard to subject-detection and/or segmentation model 1100 of FIG. 11.

Gaze-estimation model 406 may be, or may include, a machine-learning model trained to determine a gaze of one or more subjects (e.g., people and/or animals). Determining a gaze may be, or may include, determining a probability regarding whether a subject (e.g., a person or an animal) in an image is gazing into a camera which captured the image or not. Gaze-estimation model 406 may determine gazes for one or more (or all) subjects identified by subject-detection/segmentation model 404. Gaze-estimation model 406 may determine gazes based on an orientation of a head of a subject and/or based on pupils of the subject.

Depth-estimation model 408 may be, or may include, a machine-learning model trained to determine a depth estimate of one or more subjects (e.g., people). Determining depth estimates may be, or may include, determining a distance between a subject and a camera which captured an image of the subject. Depth-estimation model 408 may determine depth estimates for one or more (or all) subjects identified by subject-detection/segmentation model 404. Depth-estimation model 408 may determine depth estimates based on a degree of focus of the subjects among other things. Additionally or alternatively, depth-estimation model 408 may use information from depth sensors 412 and/or from multiple ones of image sensors 402 (e.g., using stereo-imaging techniques). Additional details regarding an example implementation of depth-estimation model 408 are given with regard to FIG. 12.

Subject-of-interest identifier 414 may be, or may include, one or more models and/or algorithms for identifying a subject-of-interest of an image. Subject-of-interest identifier 414 may identify the subjects-of-interest based on one or more criteria including, for example, gaze and/or depth. As an example, subject-of-interest identifier 414 may identify subjects-of-interest by identifying subjects gazing into a camera which captured the image of the subjects. Additionally or alternatively, subject-of-interest identifier 414 may identify subjects-of-interest by identifying subjects within a depth threshold from a previously-identified subjects-of-interest. For example, subject-of-interest identifier 414 may identify all subjects a substantially a same distance from a camera as a subject-of-interest as additional subjects-of-interest. Thus, if a group of people are posing together for a photo, and one of the people is not looking into the camera, that person may be identified as a subject-of-interest based on that person being at substantially the same depth as the others in the group.

Additionally or alternatively, subject-of-interest identifier 414 may identify unwanted subjects based on one or more criteria, for example, gaze and/or depth. As an example, subject-of-interest identifier 414 may identify any subject (or any subject not identified as a subject of interest) gazing away from a camera which captured the image as an unwanted subject. Additionally or alternatively, subject-of-interest identifier 414 may determine a depth of a subject of interest relative to the camera and depth(s) of one or more subjects in the image relative to the camera. The subject-of-interest identifier 414 may identify any subject having a depth that is greater than (or outside of) a depth threshold difference from the depth of the subject-of-interest as an unwanted subject. For example, a subject-of-interest may be 10 feet away from a camera and another subject may be 12 feet from the camera. If the depth threshold difference is 1 foot, the other subject would be determined to be an unwanted subject based on the difference between the depth of the subject-of-interest and the depth of the other subject being greater than the depth threshold difference. Additionally or alternatively, subject-of-interest identifier 414 may identify any subject that is not a subject-of-interest as an unwanted subject. For example, after having determined subjects-of-interest based on one or more criteria, subject-of-interest identifier 414 may determine that all remaining subjects are unwanted without analyzing gaze and/or depth information of the remaining subjects. Determining that subjects that were not identified as subjects-of-interest are unwanted in the image may result in subjects whose gaze and/or depth could not be determined being identified as unwanted subjects.

In cases where criteria for determining whether a subject is a subject-of-interest or an unwanted subject may conflict, the determination may be based on the order in which subject-of-interest identifier 414 makes determinations regarding subjects-of-interest and unwanted subjects (or based on another criteria). For example, in a case where a subject is more than a threshold distance from a subject-of-interest, yet the subject is gazing into the camera, subject-of-interest identifier 414 may make a final determination regarding the subject based on the order in which the determinations regarding subjects-of-interest and unwanted subjects are made. For example, the subject may be identified as a subject-of-interest based on a gaze-based determination of subjects-of-interest. Having been identified as a subject-of-interest the subject may not be later identified as unwanted. As another example, if a subject is not gazing into the camera, and is within a depth threshold from subjects-of-interest, the subject may be identified as a subject-of-interest. Having been identified as a subject-of-interest the subject may not be later identified as unwanted.

Backfill model 410 may be, or may include, one or more models and/or algorithms for removing a subject from an image and/or replacing the removed subject with pixels (e.g., background pixels). For example, backfill model 410 may remove segments (e.g., pixels) of images (as segmented by subject-detection/segmentation model 404) associated with one or more subjects identified as unwanted (e.g., by subject-of-interest identifier 414). Backfill model 410 may replace the removed segments with background pixels from the image in which the unwanted subjects are determined, from subsequent images in a sequence of images that includes the image, or from another image that includes a same or similar background as that in the background in the image. In some cases, backfill model 410 may replicate pixels or groups of pixels in the image that are adjacent to removed segments as the background pixels. In other cases, backfill model 410 may copy the background pixels from another image that includes a same or similar background as that in the background in the image. Backfill model 410 may determine whether to replicate pixels adjacent to the removed pixels as the background pixels or to obtain the background pixels from another image based on a relationship between boundary pixels that are adjacent to retained pixels and all the boundary pixels.

Figure 5:
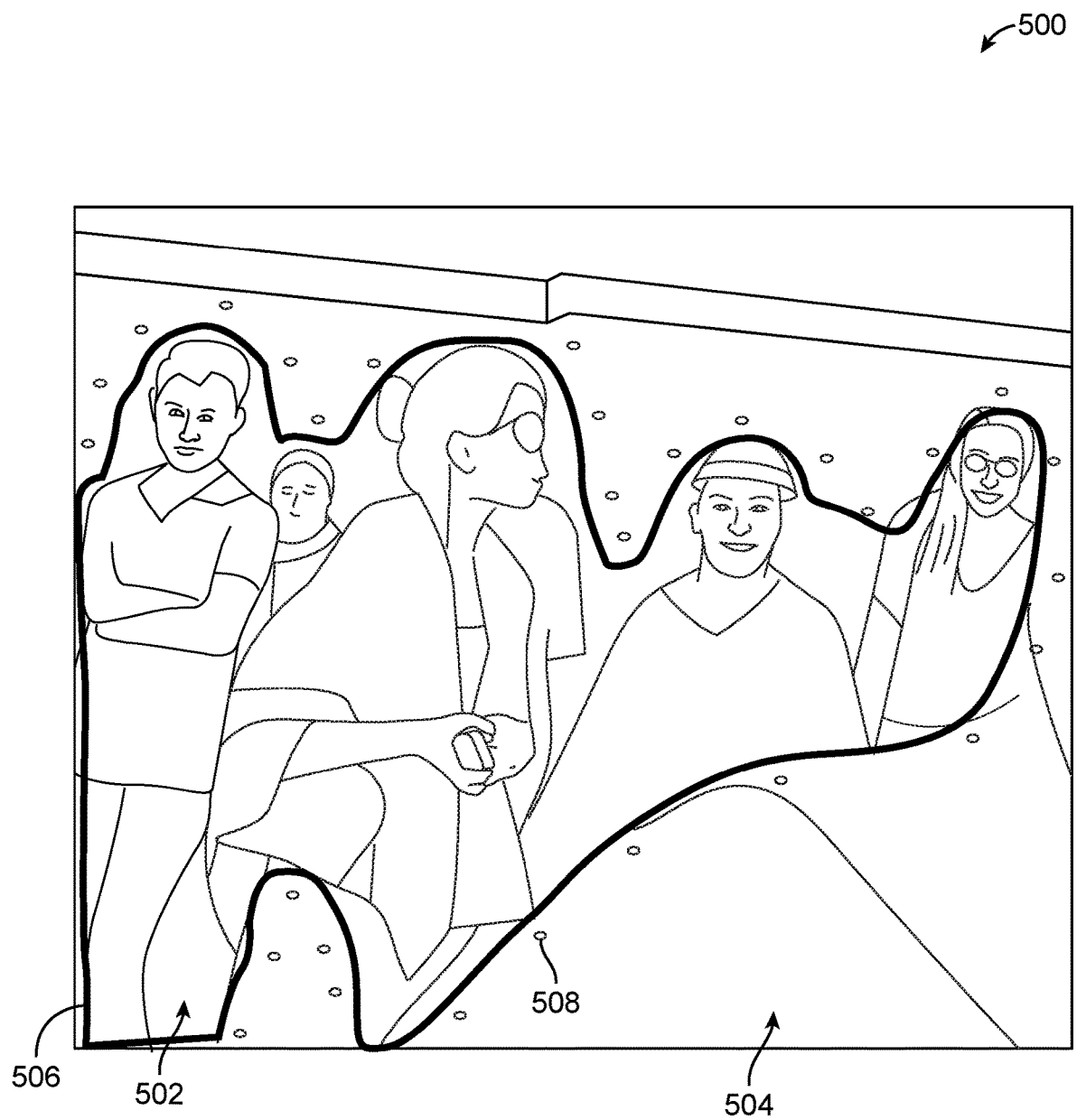
FIG. 5 illustrates an example image in accordance with some examples of the present disclosure.

FIG. 5 illustrates an image 500 providing one illustrative example of how backfill model 410 may determine whether to replace removed pixels with background pixels replicated from image 500 or from another image. Image 500 is a portion of the image 100 of FIG. 1 that includes one or more subjects in a background of the image 100. For example, image 500 includes removed pixels 502 (e.g., pixels that have been identified for removal as described herein) and retained pixels 504 (e.g., pixels that have not been identified for removal). Boundary pixels 506 may define a boundary between removed pixels 502 and retained pixels 504. Boundary pixels 506 are illustrated in FIG. 5 with a solid line. Some of the boundary pixels 506 may be at an edge of the image and may not be adjacent to retained pixels 504 (e.g., boundary pixels 506 along the left edge of image 500). Others of the boundary pixels 506 may be adjacent to retained pixels 504. Boundary pixels 506 that are adjacent to retained pixels 504 may be referred to herein as "adjacent boundary pixels 508." Adjacent boundary pixels 508 are illustrated in FIG. 5 with a dotted line.

Backfill model 410 may determine a relationship (e.g., a ratio or other relationship) between adjacent boundary pixels 508 and boundary pixels 506 (e.g., a ratio including a number of adjacent boundary pixels 508 divided by a number of boundary pixels 506). Backfill model 410 may determine whether to replicate retained pixels 504 to replace the removed pixels 502 or to copy background pixels from another image to replace removed pixels 502 based on the relationship (e.g., the ratio) relative to a threshold amount. As an illustrative example, the threshold amount can be equal to 0.70 (or 70%). In such an example, if 70% or more of the boundary pixels 506 are adjacent boundary pixels 508, adjacent pixels of retained pixels 504 may be replicated to replace removed pixels 502. On the other hand, if less than 70% of boundary pixels 506 are adjacent to retained pixels, backfill model 410 may determine to copy background pixels from another image.

As an example of how backfill model 410 may replace removed pixels 502 with boundary pixels from another image, backfill model 410 may identify a background of image 500, for example, using image-recognition model 416. Image-recognition model 416 may be, or may include a model capable of recognizing objects, (especially large objects and/or locations in backgrounds) in images. Backfill model 410 may search for and obtain another image including the background (e.g., a background image). Backfill model 410 may obtain (e.g., receive, download, etc.) the background image from a local data store (e.g., a local storage device or memory) including images or from a remote database (e.g., a cloud server, from an Internet source, etc.) including background images. In some examples, backfill model 410 may search the Internet for the background image. Once backfill model 410 has obtained the background image, backfill model 410 may replace removed pixels 502 of the target image with matching pixels from the background image.

Figure 6:
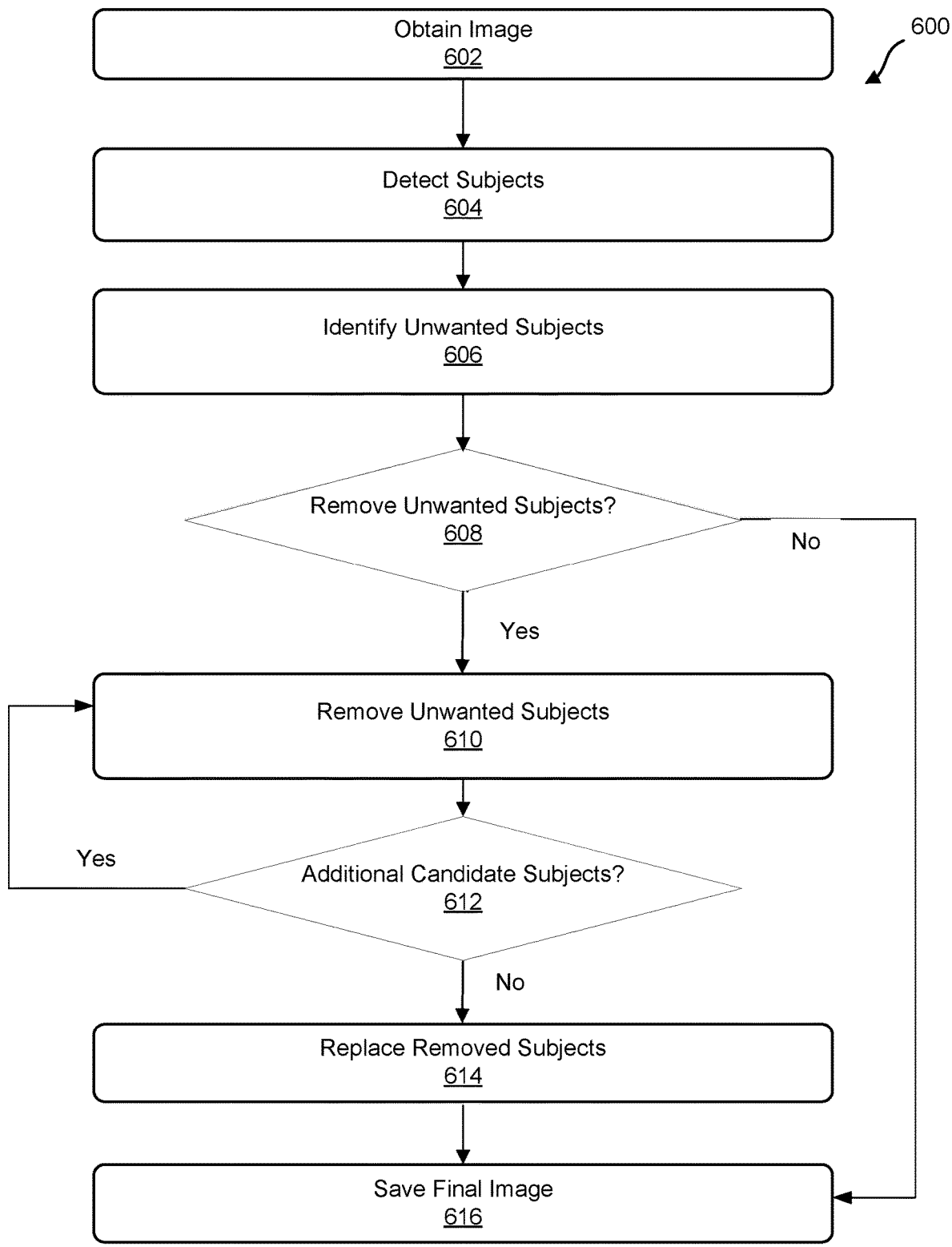
FIG. 6 is a flow diagram illustrating an example image-modification process, in accordance with some examples of the present disclosure.

FIG. 6 is a flowchart illustrating an example process 600 for performing image modification according to examples of the present disclosure. Process 600 may include modifying an image (e.g., image 100 of FIG. 1) by removing subjects (e.g., other people 104) (e.g., to generate a modified image such as image 200 of FIG. 2). The process 600 may be performed by a computing device (or apparatus) or a component (e.g., a chipset, one or more processor(s), one or more memory, any combination thereof, or other component) of the computing device. The computing device can be a mobile device (e.g., a mobile phone), a network-connected wearable such as a watch, an extended reality (XR) device (e.g., a virtual reality (VR) device or augmented reality (AR) device), a vehicle or component or system of a vehicle, a camera device, or other type of computing device. In some cases, the process 600 can be performed by the computing device implementing the image-modification system 400 of FIG. 4. The operations of the process 600 may be implemented as software components that are executed and run on one or more processors (e.g., the image processor 350 of FIG. 3, the host processor 352 of FIG. 3, the ISP 354 of FIG. 3, the processor 1510 of FIG. 15, or other processor(s)). Further, the transmission and reception of signals by the computing device in the process 600 may be enabled, for example, by one or more antennas, one or more transceivers (e.g., wireless transceiver(s)), and/or other communication components (e.g., the communication interface 1540 of FIG. 15 or other antennae(s), transceiver(s), and/or component(s)).

At block 602, the computing device (or one or more components thereof) can obtain one or more images. The images may include one or more preview images (e.g., images captured before a user instructs a device to capture an image) and a captured image (e.g., an image captured in response to a user instructing the device to capture the image). In some cases, the preview images may be stored in a preview buffer. Once the user provides an instruction to capture an image, one or more of the preview images in the preview buffer may be used to generate the captured image. The preview images may be displayed using a display of the device, for example for the user to arrange the image before capturing the captured image. Additionally or alternatively, the captured image may be displayed at the display.

At block 604, the computing device (or the one or more components thereof) can detect one or more subjects in one or more of the images. For example, subjects may be detected in the one or more preview images (and/or in the captured image). The subjects may be detected using a subject-detection model, for example, as described with regard to subject-detection/segmentation model 404 of FIG. 4 and/or subject-detection and/or segmentation model 1100 of FIG. 11.

At block 606, the computing device (or the one or more components thereof) can identify or determine some of the subjects detected at block 604 as subjects not wanted in the image (e.g., unwanted subjects). For example, at block 606, the computing device (or the one or more components thereof) can determine or identify subjects as subjects-of-interest based on one or more criteria including, for example, gaze and/or depth. As an example, subjects gazing into a camera used to capture the image may be identified as subjects-of-interest. Additionally or alternatively, subjects within a depth threshold from subjects-of-interest may additionally be identified as subjects-of-interest. For example, all subjects that are substantially a same distance (e.g., within a depth threshold difference) from a camera as a subject-of-interest may be identified as a subject-of-interest. In some cases, the computing device (or the one or more components thereof) can use the depth to determine a subject as a subject-of-interest regardless of whether the subject(s) are gazing into the camera. For example, any subject that is not gazing into or at the camera but that has a depth that is less than (or within) the depth threshold difference of another subject-of-interest in the image can be identified as a subject-of-interest.

Additionally, at block 606, the computing device (or the one or more components thereof) can determine or identify unwanted subjects based on the one or more criteria (e.g., gaze and/or depth). As an example, the computing device (or the one or more components thereof) can identify any subject gazing away from the camera used to captured the image as an unwanted subject. Additionally or alternatively, the computing device (or the one or more components thereof) can identify any subject having a depth that is greater than the depth threshold difference from a subject-of-interest as an unwanted subject. In another example, another subject that has a depth that is greater than (or outside of) the depth threshold difference of a subject-of-interest may be identified as an unwanted subject regardless of whether the other subject is gazing into the camera or not. Additionally or alternatively, any subject that is not a subject-of-interest may be identified as an unwanted subject.

The computing device (or the one or more components thereof) can determine or identify the subject(s)-of-interest and/or unwanted subject(s) in the one or more preview images and/or in the captured image obtained at block 602. For instance, unwanted subjects may be identified in the one or more preview images and, based on the identification of the unwanted subjects in the preview images, the same subjects may be identified as unwanted in the captured image. In one illustrative example, based on a position of an unwanted subject in a preview image, the computing device (or the one or more components thereof) can identify a subject in a corresponding position in a captured image as an unwanted subject (e.g., the same unwanted subject). Alternatively, the captured image may be analyzed at block 606 and subjects-of-interest and unwanted subjects may be identified in the captured image.

Figure 7A:
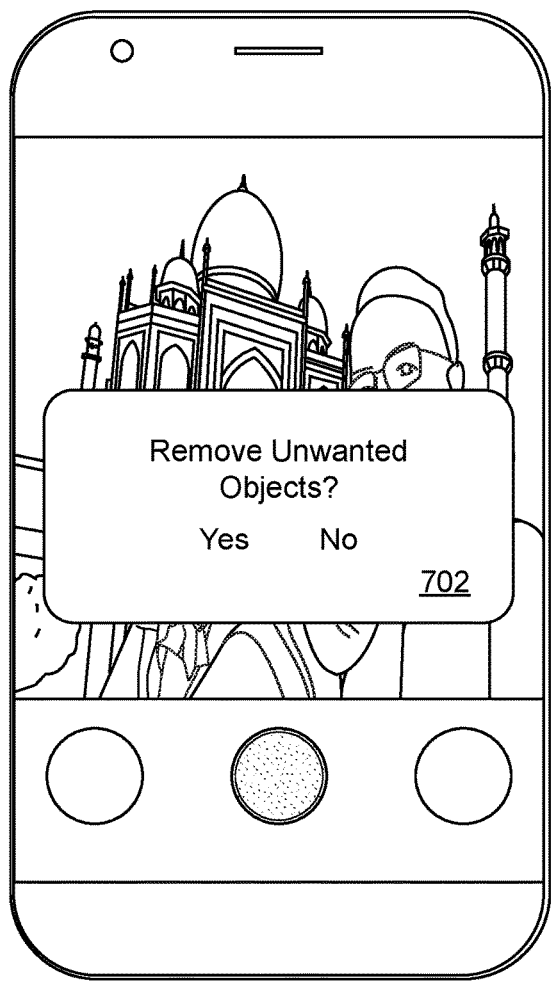
FIG. 7A illustrates an example graphical-user interface that may present a query to a user, in accordance with some examples of the present disclosure.
Figure 7B:
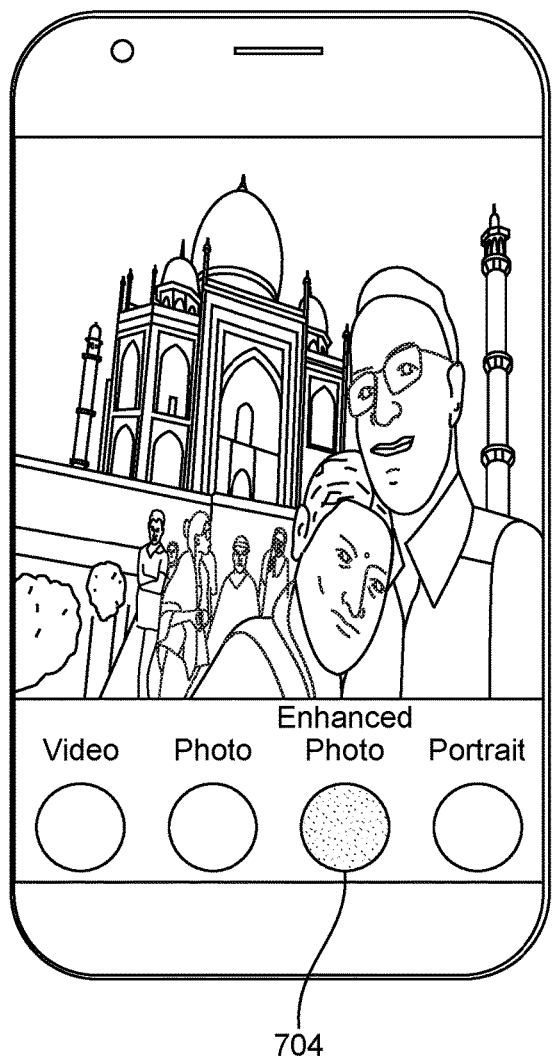
FIG. 7B illustrates another example graphical-user interface that may present receive an indication from a user, in accordance with some examples of the present disclosure.

At block 608, the computing device (or the one or more components thereof) can receive an indication or input of whether to remove unwanted subjects from an image (e.g., from a final image to be generated by process 600). As an example, a user may be queried regarding removing unwanted subjects. For example, FIG. 7A illustrates a pop-up window 702 that may be displayed as part of a graphical-user interface (GUI) querying the user regarding removing unwanted subjects. The user may be queried either before or after capturing the captured image (e.g., based on detecting subjects that may be unwanted in a preview image). As another example, as illustrated by FIG. 7B the indication regarding removing unwanted subjects may be based on a mode in which the image is captured. For example, the camera may include an "enhanced photo" mode. Capturing a photo in "enhanced photo" mode (e.g. by touching the "enhanced photo" mode button 704) may serve as in indication to remove unwanted subjects from the final image. If the received indication indicates that unwanted subjects are to be removed, process 600 advances to block 610. If the received indication indicates that they unwanted subjects are not to be removed, the captured image may be saved as a final image at block 616.

At block 610, the computing device (or the one or more components thereof) can remove unwanted subjects (as identified at block 606) from the captured image obtained at block 602. The subjects may be removed as described with regard to backfill model 410.

At block 612, following the removal of one or more subjects, the computing device (or the one or more components thereof) can determine whether additional subjects are to be removed. For example, following the removal of one or more unwanted subjects, the computing device (or the one or more components thereof) can determine or identify additional candidate unwanted subjects. The additional candidate unwanted subjects may have been identified at block 606, but may not have been removed at block 610 (e.g., based on a determination that there was a higher degree of certainty about the unwanted subjects removed at block 610 than the candidate unwanted subjects). At block 612, a user may be queried regarding removing additional subjects. For example, the modified captured image may be displayed to a user and the user may be queried regarding whether additional subjects should be removed from the modified captured image. If additional subjects are to be removed, the process may return to block 610. If no additional subjects are to be removed, the process may advance to block 614.

At block 614, the computing device (or the one or more components thereof) can replace gaps in the modified captured image left by removed unwanted subjects with background pixels. The gaps may be replaced as described with regard to backfill model 410.

At block 616, the computing device (or the one or more components thereof) can save a final image. For example, the final image may be the captured image after having unwanted subjects removed at block 610 and replaced at block 614. By saving a single final image (e.g., rather than the final image and the one or more preview images used to identify subjects-of-interest), systems and techniques may provide an advantage over other techniques (specifically other techniques that store a number of preview images as well as a final image).

Figure 8:
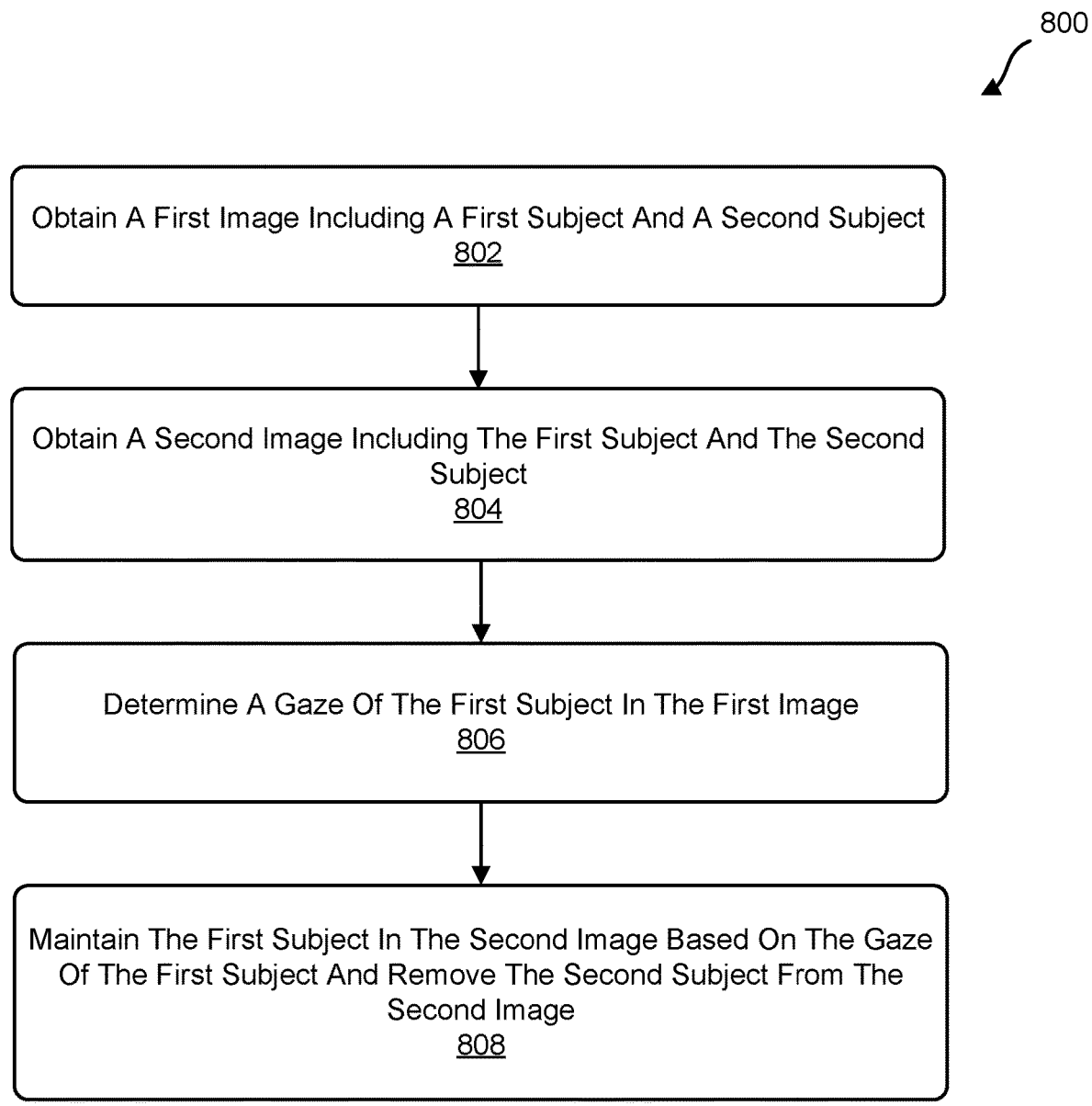
FIG. 8 is a flow diagram illustrating an example of a process for modifying one or more images, in accordance with some examples of the present disclosure.

FIG. 8 is a flow diagram illustrating another example process 800 for modifying one or more images. Process 800 may include modifying an image (e.g., image 100 of FIG. 1) by removing subjects (e.g., other people 104) (e.g., to generate a modified image such as image 200 of FIG. 2). The process 800 may be performed by a computing device (or apparatus) or a component (e.g., a chipset, one or more processor(s), one or more memory, any combination thereof, or other component) of the computing device. The computing device can be a mobile device (e.g., a mobile phone), a network-connected wearable such as a watch, an extended reality (XR) device (e.g., a virtual reality (VR) device or augmented reality (AR) device), a vehicle or component or system of a vehicle, a camera device, or other type of computing device. In some cases, the process 800 can be performed by the computing device implementing the image-modification system 400 of FIG. 4. The operations of the process 800 may be implemented as software components that are executed and run on one or more processors (e.g., the image processor 350 of FIG. 3, the host processor 352 of FIG. 3, the ISP 354 of FIG. 3, the processor 1510 of FIG. 15, or other processor(s)). Further, the transmission and reception of signals by the computing device in the process 800 may be enabled, for example, by one or more antennas, one or more transceivers (e.g., wireless transceiver(s)), and/or other communication components (e.g., the communication interface 1540 of FIG. 15 or other antenna(s), transceiver(s), and/or component(s)).

At block 802, the computing device (or one or more components thereof) can obtain a first image including a first subject and a second subject. For example, image capture device 305A of FIG. 3 may capture image 100 of FIG. 1, including people 102 and other people 104, and provide the captured image to the computing device (or the one or more components thereof). Either, or both, of people 102 may be an example of the first subject. Any, or all, of other people 104 may be an example of the second subject.

At block 804, the computing device (or the one or more components thereof) can obtain a second image including the first subject and the second subject. For example, image capture device 305A may capture image 100, including people 102 and other people 104, and provide the captured image to the computing device (or the one or more components thereof). In some aspects, the second image may be obtained from an image sensor of a device responsive to a user input instructing the device to capture the second image. Further, the first image may be obtained from the image sensor prior to receiving the user input. For example, the second image may be captured responsive to a user pushing a button to capture the second image and the first image may be a preview image (e.g., displayed by the device prior to receiving an instruction to capture the second image).

At block 806, the computing device (or the one or more components thereof) can determine a gaze of the first subject in the first image. In some aspects, determining the gaze of the first subject in the first image may include determining the gaze of the first subject in the first image using a trained gaze-estimation model. For example, image processing device 305B (e.g., using gaze-estimation model 406 of FIG. 4) may determine a gaze of one or both of people 102.

At block 808, the computing device (or the one or more components thereof) can maintain the first subject in the second image based on the gaze of the first subject and remove the second subject from the second image. For example, image processing device 305B (e.g., using subject-of-interest identifier 414, backfill model 410, and/or image-recognition model 416, all of FIG. 4) may maintain people 102 and remove other people 104. Maintaining people 102 and removing other people 104 may result in image 200 of FIG. 2.

In some aspects, process 800 may further include replacing the second subject in the second image with background pixels. For example, image processing device 305B (e.g., using backfill model 410 and/or image-recognition model 416) may replace removed pixels 502 of FIG. 5 with background pixels. In some aspects, process 800 may include detecting pixels representing the second subject in the second image using a subject-detection model and replacing the pixels representing the second subject with the background pixels. For example, image processing device 305B (e.g., using segmentation model 404, backfill model 410 and/or image-recognition model 416) may determine removed pixels 502 and replace removed pixels 502 with background pixels. In some aspects, process 800 may include identifying a background of the second image and replicating pixels from the background of the second image as the background pixels. For example, image processing device 305B (e.g., segmentation model 404 and/or using backfill model 410) may identify background pixels (e.g., pixels surrounding removed pixels 502 that are not retained pixels 504). Image processing device 305B may replicate the identified background pixels to replace removed pixels 502. In some aspects, process 800 may include identifying a background of the second image, obtaining a third image of a background of the second image, and obtaining the background pixels from the third image. For example, image processing device 305B (e.g., using image-recognition model 416) may identify a background of image 100. Image processing device 305B may obtain another image of the background of image 100 and obtain the background pixels (with which to replace removed pixels 502) from the other image of the background. In some aspects, the third image may be obtained from a remote server (e.g., via o devices 360). In other cases, the third image may be obtained from a local data storage (e.g., ROM 345 or RAM 340).

In some aspects, process 800 may further include identifying the first subject as a subject-of-interest of the second image based on the gaze of the first subject in the first image being toward an image sensor which captured the first image. Further, removing the second subject from the second image may be based on identifying the first subject as a subject-of-interest of the second image. For example, image processing device 305B (e.g., using gaze-estimation model 406 and/or subject-of-interest identifier 414) may identify people 102 as subjects-of-interest based on people 102 gazing into lens 315 of image capture device 305A. Further, image processing device 305B (e.g., using backfill model 410 and/or image-recognition model 416) may remove other people 104 based on determining that people 102 are the subjects-of-interest (e.g., based on an assumption that if people 102 are the subjects-of-interest, other people 104 are not subjects-of-interest).

Additionally or alternatively, in some aspects, process 800 may further include identifying the first subject as a subject-of-interest of the second image based on the gaze of the first subject in the first image being toward an image sensor which captured the first image. Process 800 may further include obtaining a depth estimate of the first subject in the first image using a depth-estimation algorithm and obtaining a depth estimate of the second subject in the first image using the depth-estimation algorithm. Further, process 800 may include removing the second subject from the second image may be based on identifying the first subject as a subject-of-interest of the second image and based on the depth estimate of the second subject being outside a depth threshold from the depth estimate of the first subject. For example, image processing device 305B (e.g., using gaze-estimation model 406 and/or subject-of-interest identifier 414) may identify people 102 as subjects-of-interest based on people 102 gazing into lens 315 of image capture device 305A. Further, image processing device 305B (e.g., using depth-estimation model 408) may obtain respective depth estimates of people 102 and other people 104. Further, image processing device 305B (e.g., using backfill model 410 and/or image-recognition model 416) may remove other people 104 based on determining that people 102 are the subjects-of-interest and based on the depth estimate of other people 104 being outside a depth threshold from the depth estimate of people 102.

Additionally, the first image may include a third subject and the second image may include the third subject. Process 800 may further include obtaining a depth estimate of the third subject in the first image using the depth-estimation algorithm. Further, process 800 may include maintaining the third subject in the second image based on the depth estimate of the third subject being within a depth threshold of the depth estimate of the first subject. For example, image processing device 305B (e.g., using depth-estimation model 408) may determine a depth of a third person in the images. Image processing device 305B (e.g., using subject-of-interest identifier 414) may determine to maintain the third person in the second image based on the depth estimate of the third person being within a depth threshold of the depth estimate of people 102. Process 800 may determine to maintain the third subject in cases in which a gaze of the third subject in the first image is away from an image sensor which captured the first image. For example, image processing device 305B may determine to retain the third person based on the depth comparison regardless of where the third person is gazing into the camera or not.

In some aspects, process 800 may further include determining a gaze of the second subject in the first image. Further, removing the second subject from the second image may be based on the gaze of the second subject in the first image being away from an image sensor which captured the first image. For example, image processing device 305B (e.g., using gaze-estimation model 406 may determine gaze information regarding other people 104). Further, image processing device 305B (e.g., using backfill model 410 and/or image-recognition model 416) may remove other people 104 from the second image based on the gazes of other people 104 in the first image being away from lens 315.

Figure 9:
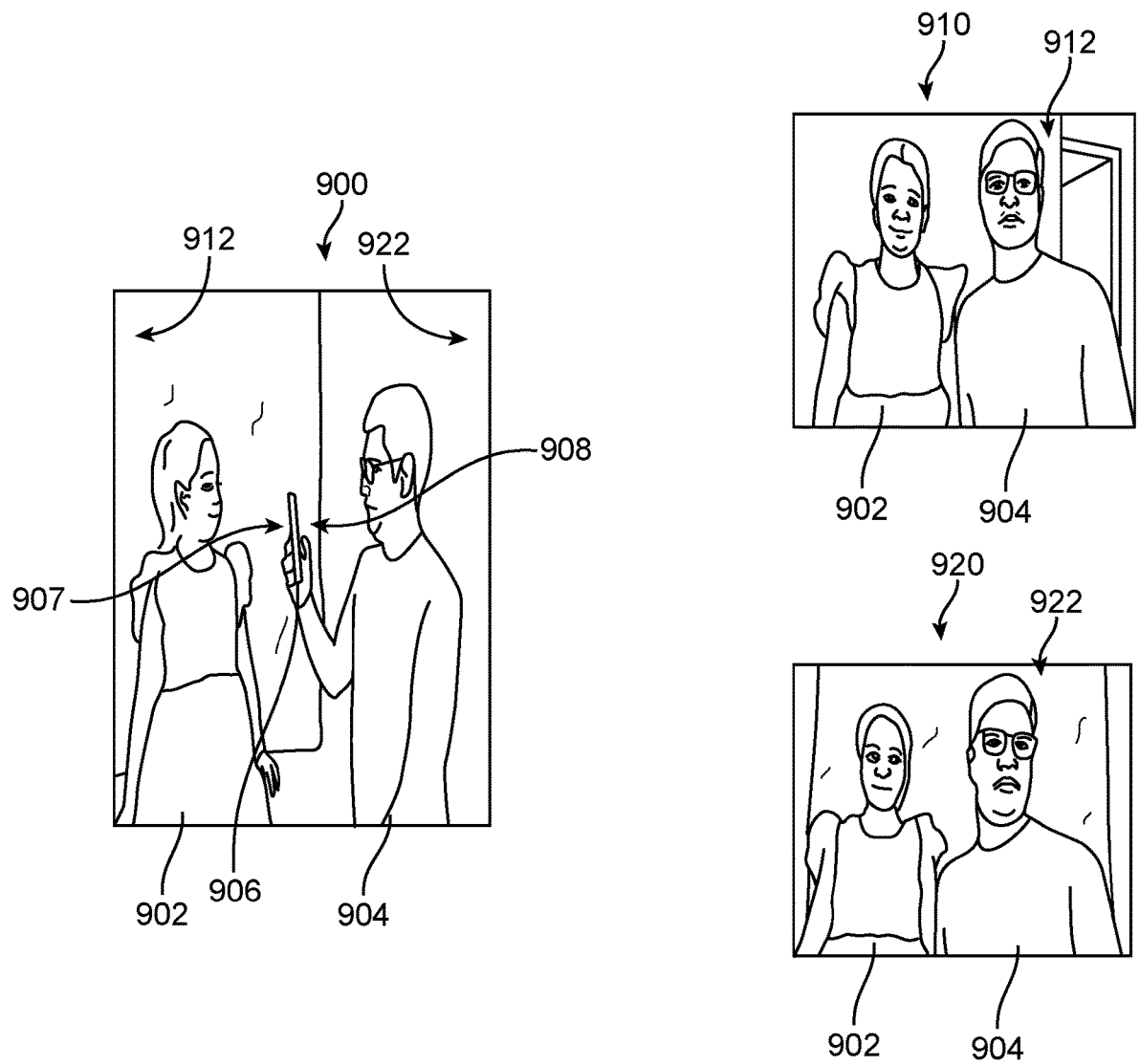
FIG. 9 illustrates an example scene and two example images, in accordance with some examples of the present disclosure.

FIG. 9 illustrates an example scene 900 and two example images (image 910 and image 920) to provide context for a description of example operations, in accordance with some examples of the present disclosure. Scene 900 includes a first person 902 at a first side 907 (e.g., a back side) of device 906 (e.g., a smartphone including a camera on a front side and a camera on a back side) and a second person 904 at second side 908 (e.g., a front side) of device 906. Though not depicted in scene 900, first background 912 is behind first person 902 in a field of view of a first camera at first side 907 of device 906 and second background 922 is behind second person 904 in a field of view of a second camera at second side 908 of device 906.

Device 906 may capture a first image of first person 902 and first background 912 using a first camera at first side 907. Device 906 may capture a second image using a second camera at second side 908. Systems and techniques described herein may identify first person 902 as a subject-of-interest of the first image using any of the criteria described herein. For example, the systems and techniques may identify first person 902 as a subject-of-interest of the first image based on first person 902 gazing into the first camera. Additionally or alternatively, the systems and techniques may identify portions of the first image including first person 902 as described herein. Additionally, systems and techniques may identify second person 904 as a subject-of-interest of the second image using any of the criteria described herein. For example, the systems and techniques may identify second person 904 as a subject-of-interest of the second image based on second person 904 gazing into the second camera. Additionally or alternatively, the systems and techniques may identify portions of the first image including second person 904 as described herein.

The systems and techniques may generate additional images based on the first image on the second image. For example, the systems and techniques may generate one or both of image 910 or image 920 based on the first image or the second image. For example, the systems and techniques may modify the first image of first person 902 and first background 912 to include second person 904 (e.g., as illustrated by image 910). Additionally or alternatively, the systems and techniques may modify the second image of second person 904 and second background 922 to include first person 902. The addition of second person 904 to image 910 may be based on the identification of second person 904 as a subject-of-interest in the second image. Likewise, the addition of first person 902 to image 920 may be based on the identification of first person 902 as a subject-of-interest in the first image.

Additionally or alternatively, the systems and techniques may capture additional images at the first and second cameras and may generate the additional images based on the additional captured images. For example, the first and second images may be preview images and may be used to identify first person 902 as a subject-of-interest in the first image (and in additional images captured by the first camera) and second person 904 as a subject-of-interest in the second images (and in additional images captured by the second camera). The systems and techniques may capture and modify additional images based on the identification of first person 902 and second person 904 as subjects-of-interest in images captured by the first and second cameras respectively.

Figure 10:
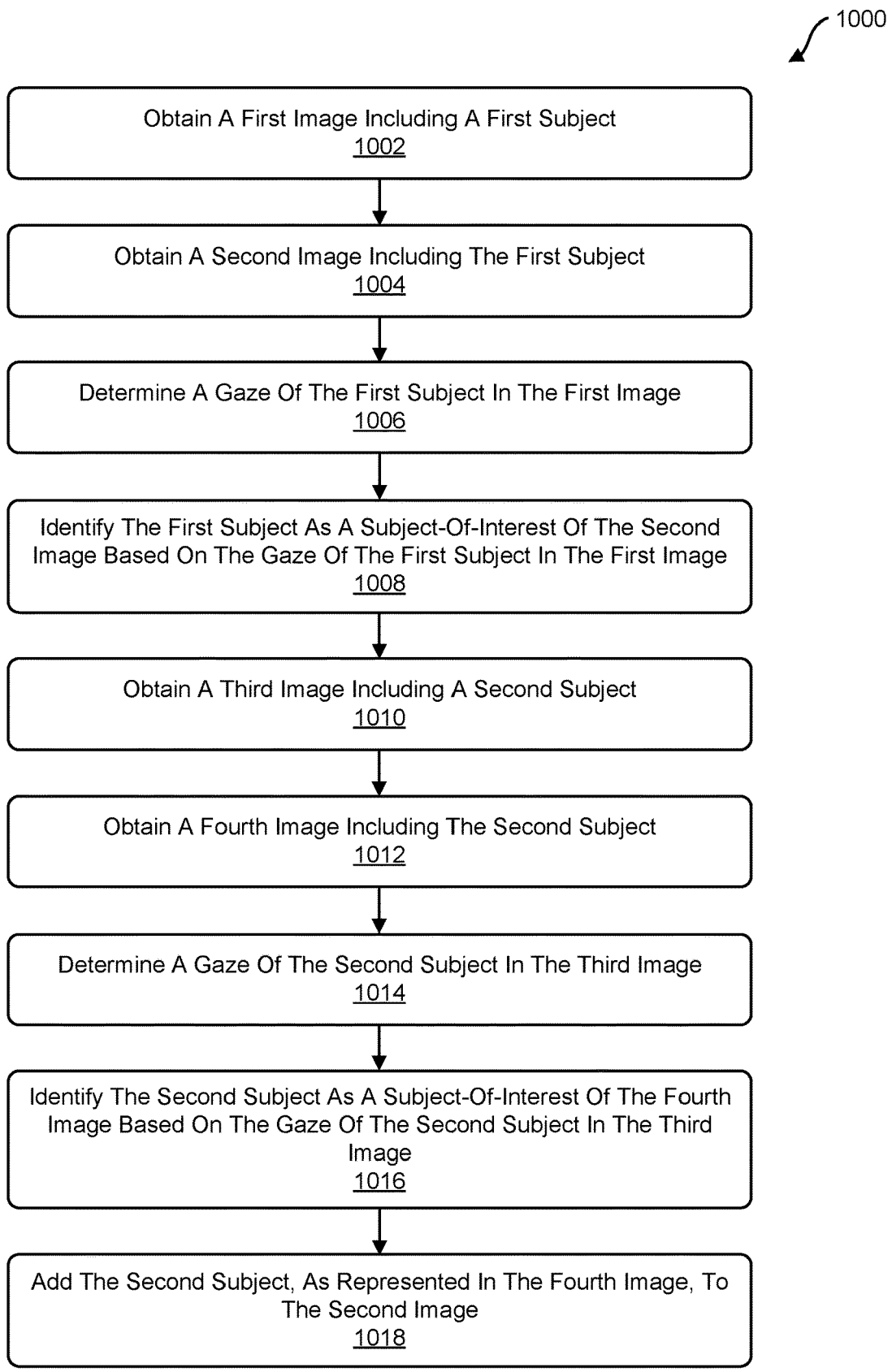
FIG. 10 is a flow diagram illustrating an example of a process for modifying one or more images, in accordance with some examples of the present disclosure.

FIG. 10 is a flow diagram illustrating another example process 1000 for modifying one or more images. Process 1000 may include modifying an image (e.g., image 910 or image 920 of FIG. 9) by adding a person from another image to the image.

At block 1002, the computing device (or one or more components thereof) can obtain a first image including a first subject. For example, device 906 of FIG. 9 may capture the first image of first person 902 of FIG. 9.

At block 1004, the computing device (or the one or more components thereof) can obtain a second image including the first subject. For example, device 906 may capture the second image of first person 902.

At block 1006, the computing device (or the one or more components thereof) can determine a gaze of the first subject in the first image. For example, device 906, (e.g. using gaze-estimation model 406) may determine a gaze of first person 902.

At block 1008, the computing device (or the one or more components thereof) can identify the first subject as a subject-of-interest of the second image based on the gaze of the first subject in the first image. For example, device 906 (e.g., using subject-of-interest identifier 414) may determine first person 902 is the subject-of-interest of the second image based on the gaze of first person 902 in the first image.

At block 1010, the computing device (or the one or more components thereof) can obtain a third image including a second subject. For example, device 906 may capture the third image of second person 904 of FIG. 9.

At block 1012, the computing device (or the one or more components thereof) can obtain a fourth image including the second subject. For example, device 906 may capture the fourth image of second person 904.

In some aspects, the first image may be obtained from a first image sensor of a device, the second image may be obtained from the first image sensor, the third image may be obtained from a second image sensor of the device, and the fourth image may be obtained from the second image sensor. In some aspects, the first image sensor is at a first side of the device and the second image sensor is at a second side of the device. For example, the first and second images may be obtained from an image sensor at first side 907 of device 906 and the third and fourth images may be obtained from an image sensor at second side 908 of device 906. Alternatively, the first image may be obtained from a first device, the second image may be obtained from the first device, the third image may be obtained from a second device, and the fourth image may be obtained from the second device.

At block 1014, the computing device (or the one or more components thereof) can determine a gaze of the second subject in the third image. For example, device 906, (e.g,. using gaze-estimation model 406) may determine a gaze of second person 904.

At block 1016, the computing device (or the one or more components thereof) can identify the second subject as a subject-of-interest of the fourth image based on the gaze of the second subject in the third image. For example, device 906 (e.g., using subject-of-interest identifier 414) may determine second person 904 is the subject-of-interest of the fourth image based on the gaze of second person 904 in the third image.

At block 1018, the computing device (or the one or more components thereof) can add the second subject, as represented in the fourth image, to the second image. For example, device 906 may add second person 904, as represented in the fourth image to the second image. Such an addition may result in image 910 of FIG. 9.

Figure 11:
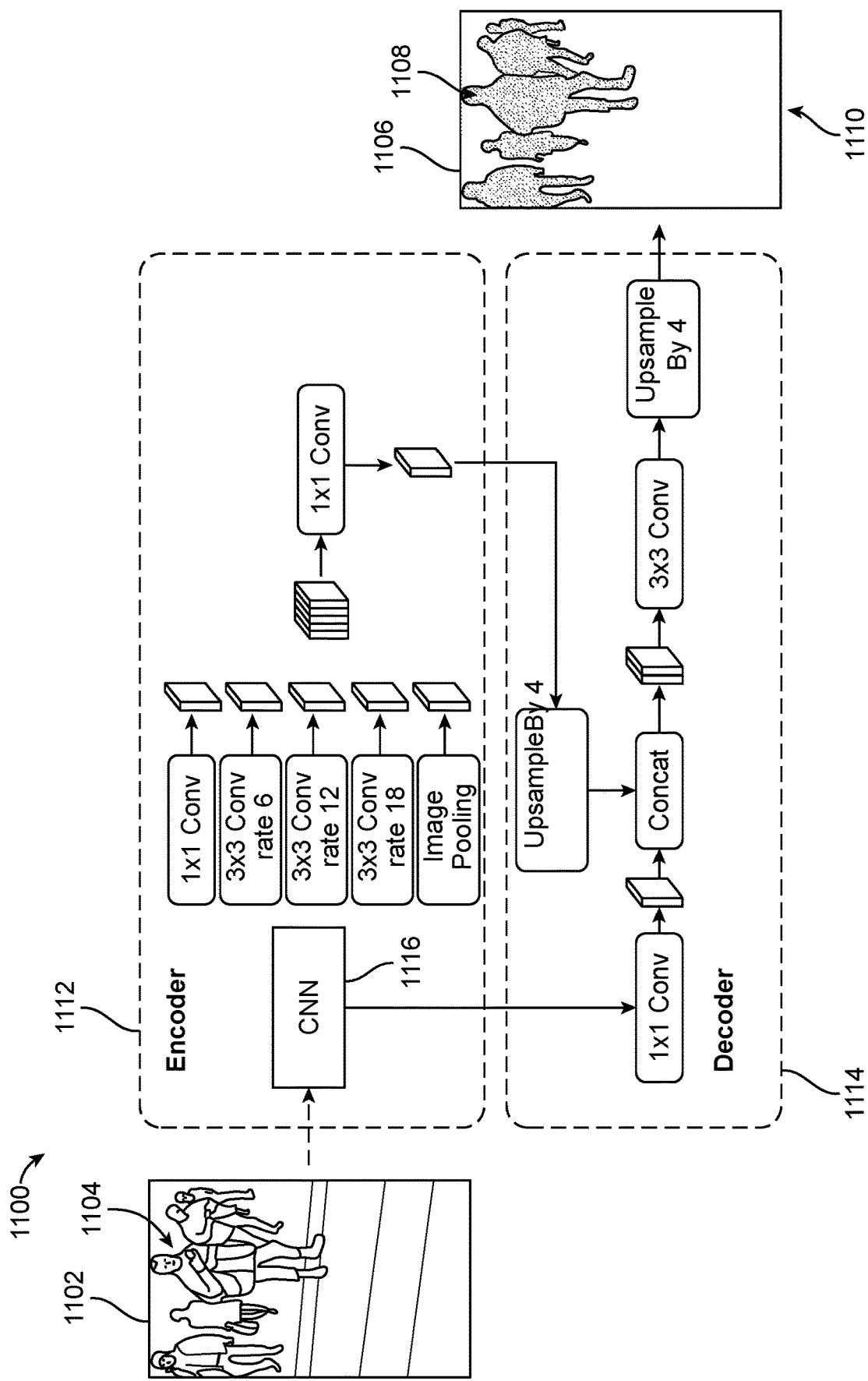
FIG. 11 is a block diagram illustrating an example of a subject-detection and/or segmentation model, in accordance with some examples of the present disclosure.

FIG. 11 illustrates an example subject-detection and/or segmentation model 1100 according to examples of the present disclosure. Subject-detection and/or segmentation model 1100 may be, or may include, a trained machine-learning model for detecting subjects 1104 in an image 1102. Additionally or alternatively, subject-detection and/or segmentation model 1100 may segment an feature map 1106 into subject segments 1108 (e.g., segments including subjects) and background segments 1110 (e.g., segments not including subjects). Subject-detection and/or segmentation model 1100 may include an encoder 1112 including a convolutional neural network 1116 and a decoder 1114.

As an example of contemplated operations of subject-detection and/or segmentation model 1100, encoder 1112 (or more specifically, convolutional neural network 1116) may extract features of image 1102. Convolutional neural network 1116 may be any suitable neural network, such as MobileNetV2. Image 1102 may have any resolution.

An output stride may be defined by the ratio of the spatial resolution of the input image (in this case image 1102) to the resolution of the output (in this case feature map 1106). A feature map (e.g., feature map 1106) may be an output of the encoder-decoder (in this case encoder 1112 and decoder 1114). Feature map 1106 may include channels (e.g., 256 channels) and semantic information. For example, feature map 1106 may include channels (illustrated as pixels) and semantic information (illustrated as light pixels indicative of subject segments 1108 and dark pixels indicative of background segments 1110). Feature map 1106 may be the used as an input (e.g., a feature-extraction input) for the global pooling layer.

Encoder 1112 may include one or more convolution layers that may reduce the channel of the low-level feature map of encoder 1112 and prevent prediction results from tilting toward low-level features for the decoder 1114. The encoder features may be concatenated with the network backbone's corresponding low-level features by bilinear up sampling.

One or more 3×3 convolutions may be used to refine the segmentation results after the concatenation. Additionally, the semantic label for each pixel may include up sampling by a factor of 4.

Figure 12:
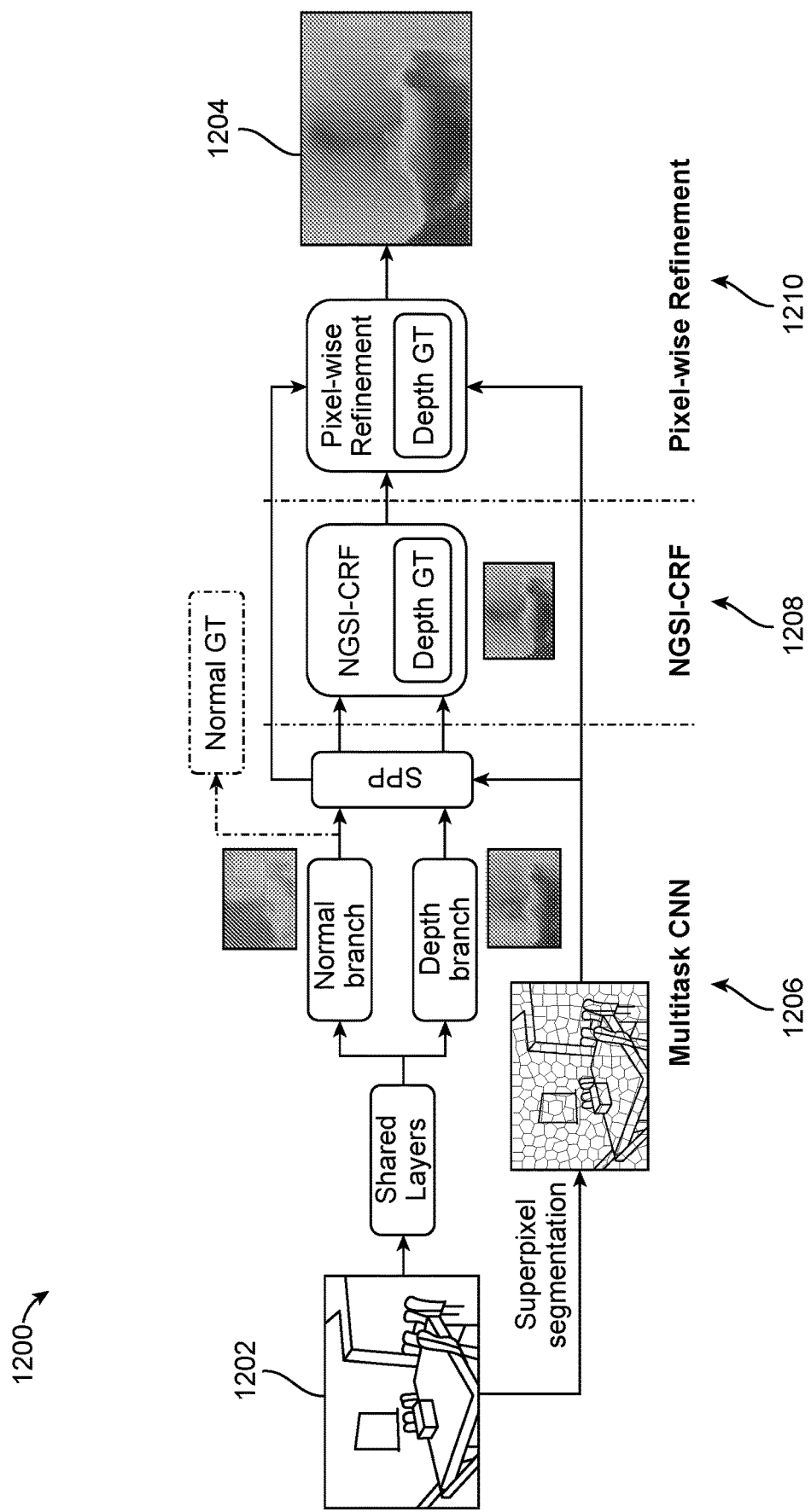
FIG. 12 is a block diagram illustrating an example of a depth-detection model, in accordance with some examples of the present disclosure.

FIG. 12 illustrates an example depth-estimation model 1200 according to examples of the present disclosure. Depth-estimation model 1200 may be, or may include, a trained machine-learning model for determining depth estimates 1204 associated one or more pixels of an image 1202.

The pixels of image 1202 may be associated with subjects, for example, based on segmentation of image 1202 into subject segments and background segments by subject detection and/or segmentation model 1100 of FIG. 11. Based on the association between pixels and subjects, depth-estimation model 1200 may estimate a depth of each subject in image 1202.

Depth-estimation model 1200 may be, or may include a normal-guided scale-invariant deep convolutional field. Depth-estimation model 1200 may include three modules: an depth-normal multitask CNN 1206, an Neurally-Guided Structure Inference Conditional Random Field (NGSI-CRF) 1208, and a pixel-wise refinement module 1210. As an overview of operations of depth-estimation model 1200, NGSI-CRF 1208 may refine the super pixel-wise depth prediction based on the surface normal prediction of each super pixel.

Multitask CNN 1206 may generate the super pixel-wise depth and surface normal predictions from the input RGB image. In some instances multitask CNN 1206 may generate the super pixel-wise depth and surface normal predictions from the input RGB image simultaneously.

The pixel-wise refinement module 1210 may receive the surface normal and refined depth predictions and may derive the pixel-wise depth estimation result.

NGSI-CRF 1208 may generate the error for the depth prediction during the learning phase, while a Euclidean loss layer and the pixel-wise refinement module generate the error for the surface normal prediction. In some cases, the Euclidean surface normal loss layer can be skipped because the pixel-wise refinement module can produce the surface normal error based on the depth ground truth. However, further stabilization of the training may be implemented, if so, the depth estimation accuracy may be reduced.

Describing the operation of multitask CNN 1206 in further detail, as the front-end model, multitask CNN 1206 may estimate surface normal and depth. In some cases, multitask CNN 1206 may estimate the surface normal and the depth simultaneously.

In some cases, multitask CNN 1206 may save computing resources by sharing the low-level convolutional layers between the depth normal prediction branch and the surface normal prediction branch. Multitask CNN 1206 may include Pyramid Scene Parsing Network (PSPNet) architecture.

Following a spatial pyramid pooling module that harvests both local and global contexts at various pooling scales, the PSPNet is made up of a dilated Residual Network-101 (ResNet-101) with 110 convolutional layers. Additionally, the predicted depth map's continuity may be enforced by the coarse-grained pooling layers acting as depth priors for the fine-grained pooling layers.

Using two separate PSPNets to perform both depth and surface normal predictions may double the amount of computing power required, which may be prohibitively expensive. In order to conserve computing power, the low-level convolutional layers are divided between depth normal models and surface normal models.

The different scales of the outputs make it difficult to share layers between the depth normal prediction model and the surface normal prediction model. The scales of the filters in the convolutional layers that correspond to them ought to be distinct as well, as the depth normal (normalized) and surface normal (normalized) have distinct scales.

However, the low-level convolutional layer filter scales may be separated from the output scale of the model by the batch normalization layer, which may normalize convolutional layer outputs. As a result, using batch normalization layers 2 should make it simpler to share more convolutional layers.

Describing the operation of NGSI-CRF 1208 in further detail, in order to maintain the consistency of the depth prediction, it is assumed that an image is made up of small, homogeneous regions (super pixels) and that the entire image can be formulated as a fully connected continuous Conditional Random Field (CRF). The super pixel is represented by its normal values and centroid depth.

Describing the operation of pixel-wise refinement module 1210, pixel-wise refinement module 1210 may transform the super-pixel-wise depth prediction produced by NGSI-CRF into the fine-grained pixel-wise depth estimation result. In addition, the depth ground truth can be used by the pixel-wise refinement module 1210 to generate the surface normal error for each super pixel during the learning process. As a result, the surface normal ground truth for the front-end multitask CNN 1206 can be trained without being generated beforehand.

In some examples, one or more of the operations of each of the processes described herein (e.g., process 600 of FIG. 6, process 800 of FIG. 8, process 1000 of FIG. 10 and/or other process described herein) may be performed by a computing device or apparatus. In one example, one or more of the operations of the processes can be performed by the image capture and processing system 300 of FIG. 3, and/or image-modification system 400 of FIG. 4. In another example, one or more of the operations of the processes can be performed by the computing system 1500 shown in FIG. 15. For instance, a computing device with the computing system 1500 shown in FIG. 15 can include, or implement, the components of the image-modification system 400 and can perform one or more of the operations of the process 600 of FIG. 6, process 800 of FIG. 8, the operations of process 1000 of FIG. 10, and/or other process described herein.

The computing device can include any suitable device, such as a vehicle or a computing device of a vehicle (e.g., a driver monitoring system (DMS) of a vehicle), a mobile device (e.g., a mobile phone), a desktop computing device, a tablet computing device, a wearable device (e.g., a VR headset, an AR headset, AR glasses, a network-connected watch or smartwatch, or other wearable device), a server computer, a robotic device, a television, and/or any other computing device with the resource capabilities to perform the processes described herein, including process 600, process 800, process 1000, and/or other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 600, process 800, process 1000 and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 600, process 800, process 1000, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 13:
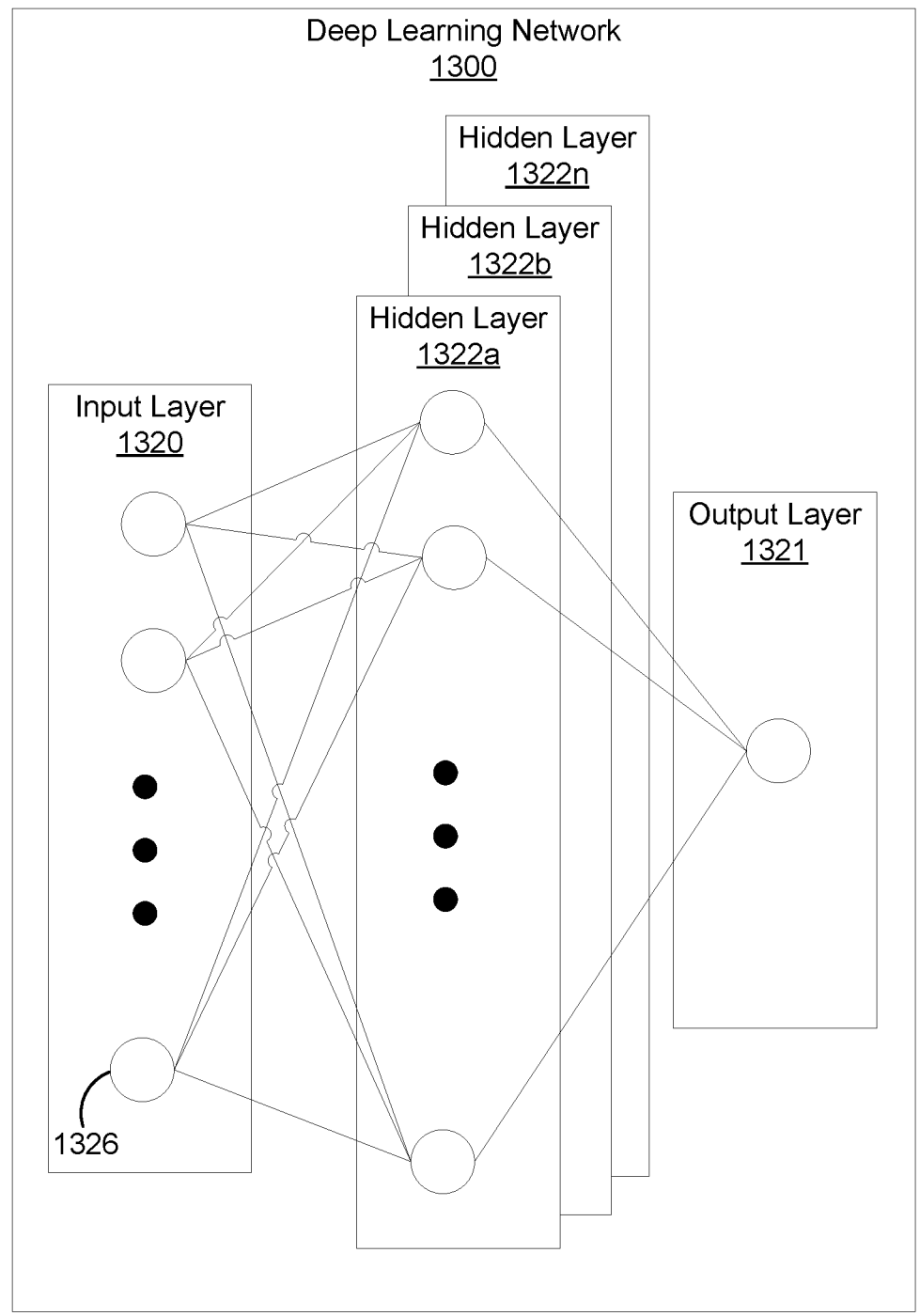
FIG. 13 is a block diagram illustrating an example of a deep learning network, in accordance with some examples of the present disclosure.

As noted above, various aspects of the present disclosure can use machine learning models or systems. FIG. 13 is an illustrative example of a deep learning neural network 1300 that can be used to implement the machine learning based feature segmentation, instance segmentation, depth estimation and/or classification described above. An input layer 1320 includes input data. In one illustrative example, the input layer 1320 can include data representing the pixels of an input image. The neural network 1300 includes multiple hidden layers 1322$a$, 1322$b$, through 1322$n$. The hidden layers 1322$a$, 1322$b$, through 1322$n$ include "n" number of hidden layers, where "n" is an integer greater than or equal to one. The number of hidden layers can be made to include as many layers as needed for the given application. The neural network 1300 further includes an output layer 1321 that provides an output resulting from the processing performed by the hidden layers 1322$a$, 1322$b$, through 1322$n$. In one illustrative example, the output layer 1321 can provide a classification for an object in a 2D input image. The classification can include a class identifying the type of activity (e.g., looking up, looking down, closing eyes, yawning, etc.).

The neural network 1300 is a multi-layer neural network of interconnected nodes. Each node can represent a piece of information. Information associated with the nodes is shared among the different layers and each layer retains information as information is processed. In some cases, the neural network 1300 can include a feed-forward network, in which case there are no feedback connections where outputs of the network are fed back into itself. In some cases, the neural network 1300 can include a recurrent neural network, which can have loops that allow information to be carried across nodes while reading in input.

Information can be exchanged between nodes through node-to-node interconnections between the various layers. Nodes of the input layer 1320 can activate a set of nodes in the first hidden layer 1322a. For example, as shown, each of the input nodes of the input layer 1320 is connected to each of the nodes of the first hidden layer 1322a. The nodes of the first hidden layer 1322a can transform the information of each input node by applying activation functions to the input node information. The information derived from the transformation can then be passed to and can activate the nodes of the next hidden layer 1322b, which can perform their own designated functions. Example functions include convolutional, up-sampling, data transformation, and/or any other suitable functions. The output of the hidden layer 1322b can then activate nodes of the next hidden layer, and so on. The output of the last hidden layer 1322n can activate one or more nodes of the output layer 1321, at which an output is provided. In some cases, while nodes (e.g., node 1326) in the neural network 1300 are shown as having multiple output lines, a node has a single output and all lines shown as being output from a node represent the same output value.

In some cases, each node or interconnection between nodes can have a weight that is a set of parameters derived from the training of the neural network 1300. Once the neural network 1300 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 1300 to be adaptive to inputs and able to learn as more and more data is processed.

The neural network 1300 is pre-trained to process the features from the data in the input layer 1320 using the different hidden layers 1322a, 1322b, through 1322n in order to provide the output through the output layer 1321. In an example in which the neural network 1300 is used to identify features in images, the neural network 1300 can be trained using training data that includes both images and labels, as described above. For instance, training images can be input into the network, with each training image having a label indicating the features in the images (for the feature segmentation machine learning system) or a label indicating classes of an activity in each image. In one example using object classification for illustrative purposes, a training image can include an image of a number 2, in which case the label for the image can be [0 0 1 0 0 0 0 0 0 0].

In some cases, the neural network 1300 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until the neural network 1300 is trained well enough so that the weights of the layers are accurately tuned.

For the example of identifying objects in images, the forward pass can include passing a training image through the neural network 1300. The weights are initially randomized before the neural network 1300 is trained. As an illustrative example, an image can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for the neural network 1300, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 1300 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as $$E_{total} = \sum \frac{1}{2}(\text{target} - \text{output})^2.$$

The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 1300 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 1300 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 1300 can include any other deep network other than a CNN, such as an autoencoder, a deep belief nets (DBNs), a Recurrent Neural Networks (RNNs), among others.

Figure 14:
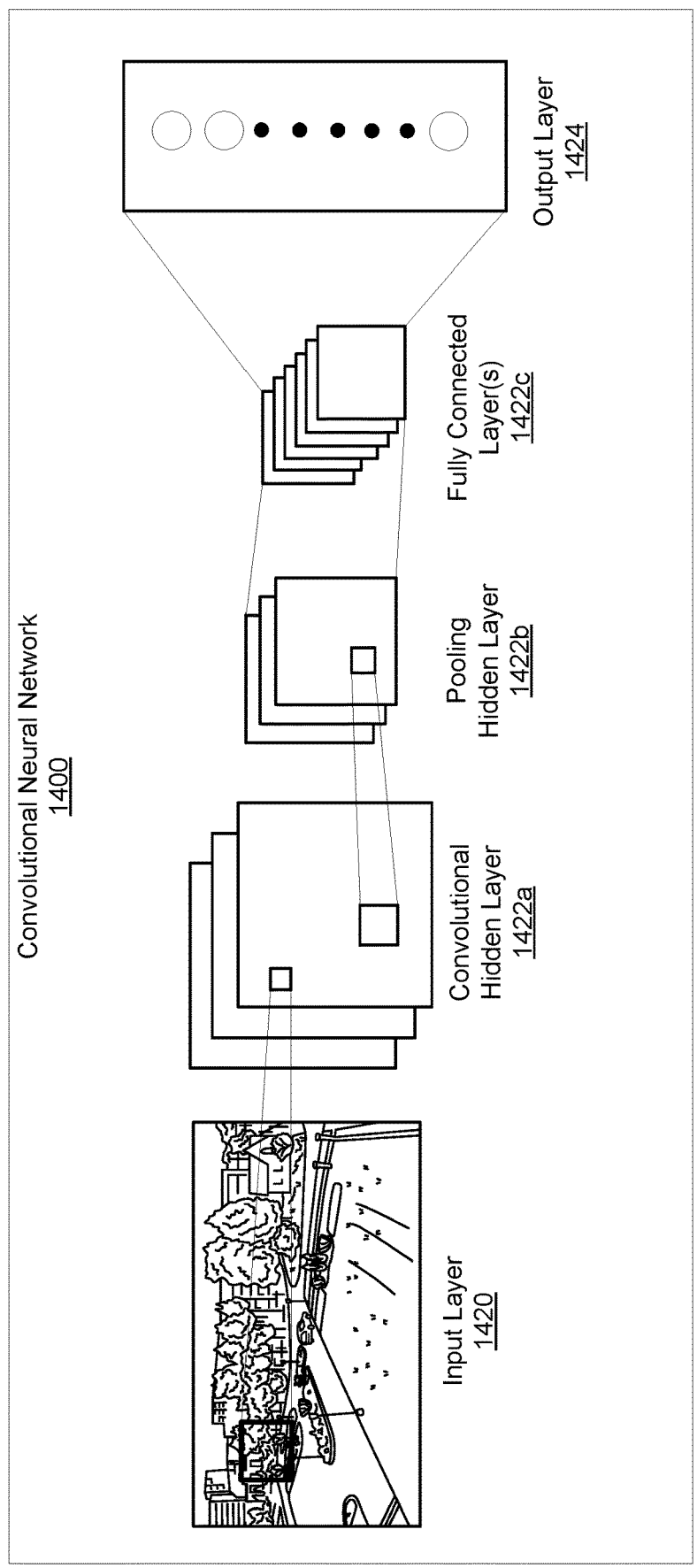
FIG. 14 is a block diagram illustrating an example of a convolutional neural network, in accordance with some examples of the present disclosure.

FIG. 14 is an illustrative example of a convolutional neural network (CNN) 1400. The input layer 1420 of the CNN 1400 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1422a, an optional non-linear activation layer, a pooling hidden layer 1422b, and fully connected hidden layers 1422c to get an output at the output layer 1424. While only one of each hidden layer is shown in FIG. 14, one of ordinary skill will appreciate that multiple convolutional hidden layers, non-linear layers, pooling hidden layers, and/or fully connected layers can be included in the CNN 1400. As previously described, the output can indicate a single class of an object or can include a probability of classes that best describe the object in the image.

The first layer of the CNN 1400 is the convolutional hidden layer 1422a. The convolutional hidden layer 1422a analyzes the image data of the input layer 1420. Each node of the convolutional hidden layer 1422a is connected to a region of nodes (pixels) of the input image called a receptive field. The convolutional hidden layer 1422a can be considered as one or more filters (each filter corresponding to a different activation or feature map), with each convolutional iteration of a filter being a node or neuron of the convolutional hidden layer 1422a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1422a. Each connection between a node and a receptive field for that node learns a weight and, in some cases, an overall bias such that each node learns to analyze its particular local receptive field in the input image. Each node of the hidden layer 1422a will have the same weights and bias (called a shared weight and a shared bias). For example, the filter has an array of weights (numbers) and the same depth as the input. A filter will have a depth of 3 for an image frame example (according to three color components of the input image). An illustrative example size of the filter array is 5×5×3, corresponding to a size of the receptive field of a node.

The convolutional nature of the convolutional hidden layer 1422a is due to each node of the convolutional layer being applied to its corresponding receptive field. For example, a filter of the convolutional hidden layer 1422a can begin in the top-left corner of the input image array and can convolve around the input image. As noted above, each convolutional iteration of the filter can be considered a node or neuron of the convolutional hidden layer 1422a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1422a. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1422a.

The mapping from the input layer to the convolutional hidden layer 1422a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1422a can include several activation maps in order to identify multiple features in an image. The example shown in FIG. 14 includes three activation maps. Using three activation maps, the convolutional hidden layer 1422a can detect three different kinds of features, with each feature being detectable across the entire image.

In some examples, a non-linear hidden layer can be applied after the convolutional hidden layer 1422a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 1400 without affecting the receptive fields of the convolutional hidden layer 1422a.

The pooling hidden layer 1422b can be applied after the convolutional hidden layer 1422a (and after the non-linear hidden layer when used). The pooling hidden layer 1422b is used to simplify the information in the output from the convolutional hidden layer 1422a. For example, the pooling hidden layer 1422b can take each activation map output from the convolutional hidden layer 1422a and generates a condensed activation map (or feature map) using a pooling function. Max-pooling is one example of a function performed by a pooling hidden layer. Other forms of pooling functions be used by the pooling hidden layer 1422a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1422a. In the example shown in FIG. 14, three pooling filters are used for the three activation maps in the convolutional hidden layer 1422a.

In some examples, max-pooling can be used by applying a max-pooling filter (e.g., having a size of 2×2) with a stride (e.g., equal to a dimension of the filter, such as a stride of 2) to an activation map output from the convolutional hidden layer 1422a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1422a having a dimension of 24×24 nodes, the output from the pooling hidden layer 1422b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1400.

The final layer of connections in the network is a fully-connected layer that connects every node from the pooling hidden layer 1422*b* to every one of the output nodes in the output layer 1424. Using the example above, the input layer includes 28×28 nodes encoding the pixel intensities of the input image, the convolutional hidden layer 1422*a* includes 3×24×24 hidden feature nodes based on application of a 5×5 local receptive field (for the filters) to three activation maps, and the pooling hidden layer 1422*b* includes a layer of 3×12×12 hidden feature nodes based on application of max-pooling filter to 2×2 regions across each of the three feature maps. Extending this example, the output layer 1424 can include ten output nodes. In such an example, every node of the 3×12×12 pooling hidden layer 1422*b* is connected to every node of the output layer 1424.

The fully connected layer 1422*c* can obtain the output of the previous pooling hidden layer 1422*b* (which should represent the activation maps of high-level features) and determines the features that most correlate to a particular class. For example, the fully connected layer 1422*c* layer can determine the high-level features that most strongly correlate to a particular class, and can include weights (nodes) for the high-level features. A product can be computed between the weights of the fully connected layer 1422*c* and the pooling hidden layer 1422*b* to obtain probabilities for the different classes. For example, if the CNN 1400 is being used to predict that an object in an image is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1424 can include an M-dimensional vector (in the prior example, M=10). M indicates the number of classes that the CNN 1400 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 15:
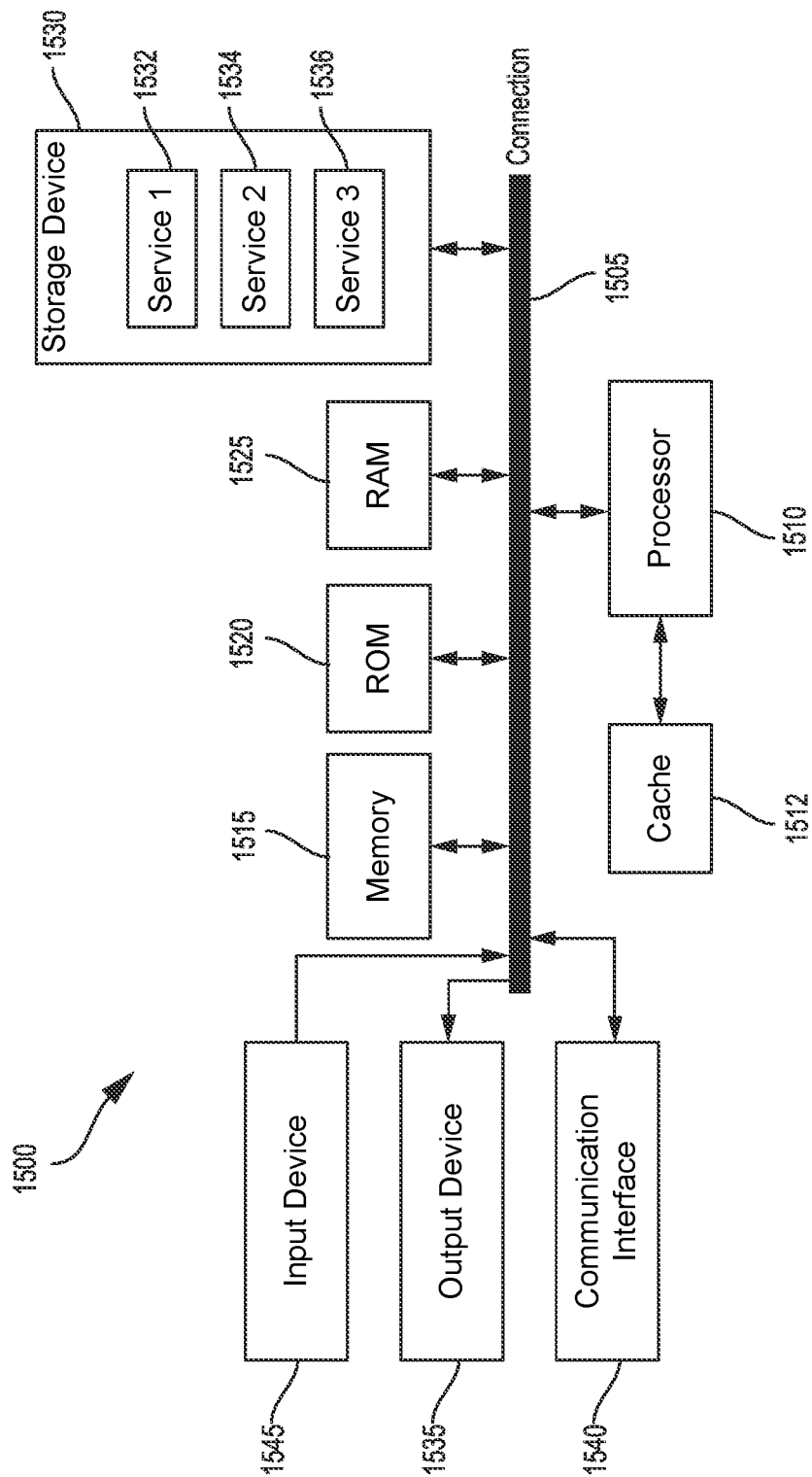
FIG. 15 is a diagram illustrating an example of a computing system for implementing certain aspects described herein.

FIG. 15 is a diagram illustrating an example of a system for implementing certain aspects of the present technology. In particular, FIG. 15 illustrates an example of computing system 1500, which can be for example any computing device making up internal computing system, a remote computing system, a camera, or any component thereof in which the components of the system are in communication with each other using connection 1505. Connection 1505 can be a physical connection using a bus, or a direct connection into processor 1510, such as in a chipset architecture. Connection 1505 can also be a virtual connection, networked connection, or logical connection.

In some aspects, computing system 1500 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example computing system 1500 includes at least one processing unit (CPU or processor) 1510 and connection 1505 that couples various system components including system memory 1515, such as read-only memory (ROM) 1520 and random access memory (RAM) 1525 to processor 1510. Computing system 1500 can include a cache 1512 of high-speed memory connected directly with, in close proximity to, or integrated as part of processor 1510.

Processor 1510 can include any general purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which can represent any number of input mechanisms, such as a microphone for speech, a touch-sensitive screen for gesture or graphical input, keyboard, mouse, motion input, speech, etc. Computing system 1500 can also include output device 1535, which can be one or more of a number of output mechanisms. In some instances, multimodal systems can enable a user to provide multiple types of input/output to communicate with computing system 1500. Computing system 1500 can include communications interface 1540, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1540 may also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1530 can include software services, servers, services, etc., that when the code that defines such software is executed by the processor 1510, it causes the system to perform a function. In some aspects, a hardware service that performs a particular function can include the software component stored in a computer-readable medium in connection with the necessary hardware components, such as processor 1510, connection 1505, output device 1535, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative Aspects of the Disclosure Include:

Aspect 1. An apparatus for generating an image, the apparatus comprising: at least one memory; and at least one processor coupled to the at least one memory and configured to: obtain a first image including a first subject and a second subject; obtain a second image including the first subject and the second subject; determine a gaze of the first subject in the first image; and maintain the first subject in the second image based on the gaze of the first subject and remove the second subject from the second image.

Aspect 2. The apparatus of aspect 1, wherein the at least one processor is further configured to: identify the first subject as a subject-of-interest of the second image based on the gaze of the first subject in the first image being toward an image sensor which captured the first image; and remove the second subject from the second image based on identifying the first subject as a subject-of-interest of the second image.

Aspect 3. The apparatus of any one of aspects 1 or 2, wherein the at least one processor is further configured to: identify the first subject as a subject-of-interest of the second image based on the gaze of the first subject in the first image being toward an image sensor which captured the first image; obtain a depth estimate of the first subject in the first image using a depth-estimation algorithm; and obtain a depth estimate of the second subject in the first image using the depth-estimation algorithm; wherein removing the second subject from the second image is based on identifying the first subject as a subject-of-interest of the second image and based on the depth estimate of the second subject being outside a depth threshold from the depth estimate of the first subject.

Aspect 4. The apparatus of any one of aspects 1 to 3, wherein the at least one processor is further configured to: determine a gaze of the second subject in the first image; and remove the second subject from the second image based on the gaze of the second subject in the first image being away from an image sensor which captured the first image.

Aspect 5. The apparatus of any one of aspects 1 to 4, wherein: the first image includes a third subject; the second image includes the third subject; and the at least one processor is further configured to: obtain a depth estimate of the first subject in the first image using a depth-estimation algorithm; obtain a depth estimate of the third subject in the first image using the depth-estimation algorithm; and maintain the third subject in the second image based on the depth estimate of the third subject being within a depth threshold of the depth estimate of the first subject.

Aspect 6. The apparatus of aspect 5, wherein a gaze of the third subject in the first image is away from an image sensor which captured the first image.

Aspect 7. The apparatus of any one of aspects 1 to 6, wherein: the second image is obtained from an image sensor of a device responsive to a user input instructing the device to capture the second image; and the first image is obtained from the image sensor prior to receiving the user input.

Aspect 8. The apparatus of any one of aspects 1 to 7, wherein the at least one processor is configured to, in determining the gaze of the first subject in the first image, determine the gaze of the first subject in the first image using a trained gaze-estimation model.

Aspect 9. The apparatus of any one of aspects 1 to 8, wherein the at least one processor is further configured to replace the second subject in the second image with background pixels.

Aspect 10. The apparatus of aspect 9, wherein the at least one processor is configured to, in replacing the second subject in the second image: detect pixels representing the second subject in the second image using a subject-detection model; and replace the pixels representing the second subject with the background pixels.

Aspect 11. The apparatus of any one of aspects 9 or 10, wherein the at least one processor is further configured to: identify a background of the second image; and replicate pixels from the background of the second image as the background pixels.

Aspect 12. The apparatus of any one of aspects 9 to 11, wherein the at least one processor is further configured to: identify a background of the second image; obtain a third image of a background of the second image; and obtain the background pixels from the third image.

Aspect 13. The apparatus of aspect 12, wherein the third image is obtained from a remote server.

Aspect 14. The apparatus of any one of aspects 1 to 13, wherein the at least one processor is further configured to: obtain a third image including a third subject; obtain a fourth image including the third subject; identify a gaze of the third subject in the third image; and add the second subject to the second image.

Aspect 15. The apparatus of aspect 14, wherein: the first image is obtained from a first image sensor of a device; the second image is obtained from the first image sensor; the third image is obtained from a second image sensor of the device; and the fourth image is obtained from the second image sensor.

Aspect 16. The apparatus of aspect 15, wherein the first image sensor is at a first side of the device and the second image sensor is at a second side of the device.

Aspect 17. The apparatus of aspect 14, wherein: the first image is obtained from a first device; the second image is obtained from the first device; the third image is obtained from a second device; and the fourth image is obtained from the second device.

Aspect 18. A method for generating an image, the method comprising: obtaining a first image including a first subject and a second subject; obtaining a second image including the first subject and the second subject; determining a gaze of the first subject in the first image; and maintaining the first subject in the second image based on the gaze of the first subject and removing the second subject from the second image.

Aspect 19. The method of aspect 18, further comprising: identifying the first subject as a subject-of-interest of the second image based on the gaze of the first subject in the first image being toward an image sensor which captured the first image; wherein removing the second subject from the second image is based on identifying the first subject as a subject-of-interest of the second image.

Aspect 20. The method of any one of aspect 18 or 19, further comprising: identifying the first subject as a subject-of-interest of the second image based on the gaze of the first subject in the first image being toward an image sensor which captured the first image; obtaining a depth estimate of the first subject in the first image using a depth-estimation algorithm; and obtaining a depth estimate of the second subject in the first image using the depth-estimation algorithm; wherein removing the second subject from the second image is based on identifying the first subject as a subject-of-interest of the second image and based on the depth estimate of the second subject being outside a depth threshold from the depth estimate of the first subject.

Aspect 21. The method of any one of aspect 18 to 20, further comprising: determining a gaze of the second subject in the first image; wherein removing the second subject from the second image is based on the gaze of the second subject in the first image being away from an image sensor which captured the first image.

Aspect 22. The method of any one of aspect 18 to 21, wherein: the first image includes a third subject; the second image includes the third subject; and the method further comprises: obtaining a depth estimate of the first subject in the first image using a depth-estimation algorithm; obtaining a depth estimate of the third subject in the first image using the depth-estimation algorithm; and maintaining the third subject in the second image based on the depth estimate of the third subject being within a depth threshold of the depth estimate of the first subject.

Aspect 23. The method of aspect 22, wherein a gaze of the third subject in the first image is away from an image sensor which captured the first image.

Aspect 24. The method of any one of aspect 18 to 23, wherein: the second image is obtained from an image sensor of a device responsive to a user input instructing the device to capture the second image; and the first image is obtained from the image sensor prior to receiving the user input.

Aspect 25. The method of any one of aspect 18 to 24, wherein determining the gaze of the first subject in the first image comprises determining the gaze of the first subject in the first image using a trained gaze-estimation model.

Aspect 26. The method of any one of aspect 18 to 25, further comprising replacing the second subject in the second image with background pixels.

Aspect 27. The method of aspect 26, wherein replacing the second subject in the second image comprises: detecting pixels representing the second subject in the second image using a subject-detection model; and replacing the pixels representing the second subject with the background pixels.

Aspect 28. The method of any one of aspect 26 or 27, further comprising: identifying a background of the second image; and replicating pixels from the background of the second image as the background pixels.

Aspect 29. The method of any one of aspect 26 to 28, further comprising: identifying a background of the second image; obtaining a third image of a background of the second image; and obtaining the background pixels from the third image.

Aspect 30. The method of any one of aspect 26 to 29, wherein the third image is obtained from a remote server.

Aspect 31. The method of any one of aspect 18 to 30, further comprising: obtaining a third image including a third subject; obtaining a fourth image including the third subject; identifying a gaze of the third subject in the third image; and adding the second subject to the second image.

Aspect 32. The method of aspect 31, wherein: the first image is obtained from a first image sensor of a device; the second image is obtained from the first image sensor; the third image is obtained from a second image sensor of the device; and the fourth image is obtained from the second image sensor.

Aspect 33. The method of any one of aspect 31 or 32, wherein the first image sensor is at a first side of the device and the second image sensor is at a second side of the device.

Aspect 34. The method of aspect 31, wherein: the first image is obtained from a first device; the second image is obtained from the first device; the third image is obtained from a second device; and the fourth image is obtained from the second device.

Aspect 35. A method of generating an image, the method comprising: obtaining a first image including a first subject; obtaining a second image including the first subject; determining a gaze of the first subject in the first image; identifying the first subject as a subject-of-interest of the second image based on the gaze of the first subject in the first image; obtaining a third image including a second subject; obtaining a fourth image including the second subject; determining a gaze of the second subject in the third image; identifying the second subject as a subject-of-interest of the fourth image based on the gaze of the second subject in the third image; and adding the second subject, as represented in the fourth image, to the second image.

Aspect 36. A non-transitory computer-readable storage medium having stored thereon instructions that, when executed by at least one processor, cause the at least one processor to perform operations according to any of aspects 18 to 35.

Aspect 37. An apparatus for providing virtual content for display, the apparatus comprising one or more means for perform operations according to any of aspects 18 to 35.

What is claimed is:

1. An apparatus for generating an image, the apparatus comprising:
   at least one memory; and
   at least one processor coupled to the at least one memory and configured to:
     obtain a first image including a first subject and a second subject;
     obtain a second image including the first subject and the second subject;
     determine a gaze of the first subject in the first image;
     maintain the first subject in the second image based on the gaze of the first subject;
     obtain a depth estimate of the first subject in the first image using a depth-estimation algorithm;
     obtain a depth estimate of the second subject in the first image using the depth-estimation algorithm; and
     remove the second subject from the second image based on the depth estimate of the second subject being outside a depth threshold from the depth estimate of the first subject.

2. The apparatus of claim 1, wherein the at least one processor is further configured to:
   identify the first subject as a subject-of-interest of the second image based on the gaze of the first subject in the first image being toward an image sensor which captured the first image; and
   remove the second subject from the second image based on identifying the first subject as a subject-of-interest of the second image.

3. The apparatus of claim 1, wherein the at least one processor is further configured to:
   identify the first subject as a subject-of-interest of the second image based on the gaze of the first subject in the first image being toward an image sensor which captured the first image;
   wherein removing the second subject from the second image is further based on identifying the first subject as a subject-of-interest of the second image.

4. The apparatus of claim 1, wherein the at least one processor is further configured to:
- determine a gaze of the second subject in the first image; and
- remove the second subject from the second image based on the gaze of the second subject in the first image being away from an image sensor which captured the first image.

5. The apparatus of claim 1, wherein:
the first image includes a third subject;
the second image includes the third subject; and
the at least one processor is further configured to:
- obtain a depth estimate of the first subject in the first image using a depth-estimation algorithm;
- obtain a depth estimate of the third subject in the first image using the depth-estimation algorithm; and
- maintain the third subject in the second image based on the depth estimate of the third subject being within a depth threshold of the depth estimate of the first subject.

6. The apparatus of claim 5, wherein a gaze of the third subject in the first image is away from an image sensor which captured the first image.

7. The apparatus of claim 1, wherein:
the second image is obtained from an image sensor of a device responsive to a user input instructing the device to capture the second image; and
the first image is obtained from the image sensor prior to receiving the user input.

8. The apparatus of claim 1, wherein the at least one processor is configured to, in determining the gaze of the first subject in the first image, determine the gaze of the first subject in the first image using a trained gaze-estimation model.

9. The apparatus of claim 1, wherein the at least one processor is further configured to replace the second subject in the second image with background pixels.

10. The apparatus of claim 9, wherein the at least one processor is configured to, in replacing the second subject in the second image:
- detect pixels representing the second subject in the second image using a subject-detection model; and
- replace the pixels representing the second subject with the background pixels.

11. The apparatus of claim 9, wherein the at least one processor is further configured to:
- identify a background of the second image; and
- replicate pixels from the background of the second image as the background pixels.

12. The apparatus of claim 9, wherein the at least one processor is further configured to:
- identify a background of the second image;
- obtain a third image of a background of the second image; and
- obtain the background pixels from the third image.

13. The apparatus of claim 12, wherein the third image is obtained from a remote server.

14. The apparatus of claim 1, wherein the at least one processor is further configured to:
- obtain a third image including a third subject;
- obtain a fourth image including the third subject;
- identify a gaze of the third subject in the third image; and
- add the third subject to the second image.

15. The apparatus of claim 14, wherein:
the first image is obtained from a first image sensor of a device;
the second image is obtained from the first image sensor;
the third image is obtained from a second image sensor of the device; and
the fourth image is obtained from the second image sensor.

16. The apparatus of claim 15, wherein the first image sensor is at a first side of the device and the second image sensor is at a second side of the device.

17. The apparatus of claim 14, wherein:
the first image is obtained from a first device;
the second image is obtained from the first device;
the third image is obtained from a second device; and
the fourth image is obtained from the second device.

18. A method for generating an image, the method comprising:
- obtaining a first image including a first subject and a second subject;
- obtaining a second image including the first subject and the second subject;
- determining a gaze of the first subject in the first image;
- maintaining the first subject in the second image based on the gaze of the first subject;
- obtaining a depth estimate of the first subject in the first image using a depth-estimation algorithm;
- obtaining a depth estimate of the second subject in the first image using the depth-estimation algorithm; and
- removing the second subject from the second image based on the depth estimate of the second subject being outside a depth threshold from the depth estimate of the first subject.

19. The method of claim 18, further comprising:
- identifying the first subject as a subject-of-interest of the second image based on the gaze of the first subject in the first image being toward an image sensor which captured the first image;
- wherein removing the second subject from the second image is based on identifying the first subject as a subject-of-interest of the second image.

20. The method of claim 18, further comprising:
- identifying the first subject as a subject-of-interest of the second image based on the gaze of the first subject in the first image being toward an image sensor which captured the first image;
- wherein removing the second subject from the second image is further based on identifying the first subject as a subject-of-interest of the second image.

21. The method of claim 18, further comprising:
- determining a gaze of the second subject in the first image;
- wherein removing the second subject from the second image is based on the gaze of the second subject in the first image being away from an image sensor which captured the first image.

22. The method of claim 18, wherein:
the first image includes a third subject;
the second image includes the third subject; and
the method further comprises:
- obtaining a depth estimate of the first subject in the first image using a depth-estimation algorithm;
- obtaining a depth estimate of the third subject in the first image using the depth-estimation algorithm; and
- maintaining the third subject in the second image based on the depth estimate of the third subject being within a depth threshold of the depth estimate of the first subject.

23. The method of claim 22, wherein a gaze of the third subject in the first image is away from an image sensor which captured the first image.

24. The method of claim 18, wherein:
the second image is obtained from an image sensor of a device responsive to a user input instructing the device to capture the second image; and
the first image is obtained from the image sensor prior to receiving the user input.

25. The method of claim 18, wherein determining the gaze of the first subject in the first image comprises determining the gaze of the first subject in the first image using a trained gaze-estimation model.

26. The method of claim 18, further comprising replacing the second subject in the second image with background pixels.

27. The method of claim 26, wherein replacing the second subject in the second image comprises:
detecting pixels representing the second subject in the second image using a subject-detection model; and
replacing the pixels representing the second subject with the background pixels.

28. The method of claim 26, further comprising:
identifying a background of the second image; and
replicating pixels from the background of the second image as the background pixels.

29. The method of claim 26, further comprising:
identifying a background of the second image;
obtaining a third image of a background of the second image; and
obtaining the background pixels from the third image.

30. The method of claim 29, wherein the third image is obtained from a remote server.

\* \* \* \* \*